US008135799B2

(12) United States Patent
Mekikian

(10) Patent No.: US 8,135,799 B2
(45) Date of Patent: Mar. 13, 2012

(54) ELECTRONIC MEDIA DOWNLOAD AND DISTRIBUTION USING REAL-TIME MESSAGE MATCHING AND CONCATENATION

(76) Inventor: Gary C. Mekikian, Canada, CA (US)

( * ) Notice: Subject to any disclaimer, the term of this patent is extended or adjusted under 35 U.S.C. 154(b) by 1083 days.

(21) Appl. No.: 11/622,401

(22) Filed: Jan. 11, 2007

(65) Prior Publication Data

US 2007/0219949 A1 Sep. 20, 2007

Related U.S. Application Data

(63) Continuation-in-part of application No. 11/531,229, filed on Sep. 12, 2006, now abandoned.

(60) Provisional application No. 60/862,752, filed on Oct. 24, 2006, provisional application No. 60/744,515, filed on Apr. 10, 2006, provisional application No. 60/757,613, filed on Jan. 11, 2006.

(51) Int. Cl.
*G06F 7/00* (2006.01)
*G06F 15/16* (2006.01)
*G06Q 30/00* (2012.01)

(52) U.S. Cl. .................... 709/217; 707/607; 705/14.56

(58) Field of Classification Search ............ 707/10, 707/600; 705/14.46

See application file for complete search history.

(56) References Cited

U.S. PATENT DOCUMENTS

| 5,931,901 A | 8/1999 | Wolfe et al. |
| 6,324,519 B1 | 11/2001 | Eldering |
| 6,632,992 B2 | 10/2003 | Hasegawa |
| 2001/0018858 A1* | 9/2001 | Dwek ............................ 84/609 |
| 2002/0032752 A1 | 3/2002 | Gold et al. |
| 2003/0093476 A1* | 5/2003 | Syed .............................. 709/204 |
| 2005/0154636 A1* | 7/2005 | Hildinger et al. ............... 705/14 |
| 2007/0061328 A1* | 3/2007 | Ramer et al. .................... 707/10 |

OTHER PUBLICATIONS

File History for case U.S. Appl. No. 11/531,229, including Office action.

* cited by examiner

*Primary Examiner* — Xavier Szewai Wong
*Assistant Examiner* — Anish Sikri

(57) ABSTRACT

Methods for distributing content, which may include requesting a download of particular content; wherein the particular content is combined with additional content not specifically requested; storing the particular content and the additional content in a user's content play device; receiving a user request to play the particular content; determining whether the additional content has expired; if it is not determined that the additional content has expired, in response to user request to play the particular content, playing the particular content on the content play device and the additional content; and if it is determined that the additional content has expired, in response to user request to play the particular content, playing the particular content on the content play device without playing the additional content. Also described are systems for providing content and devices for playing content and various other embodiments.

26 Claims, 23 Drawing Sheets

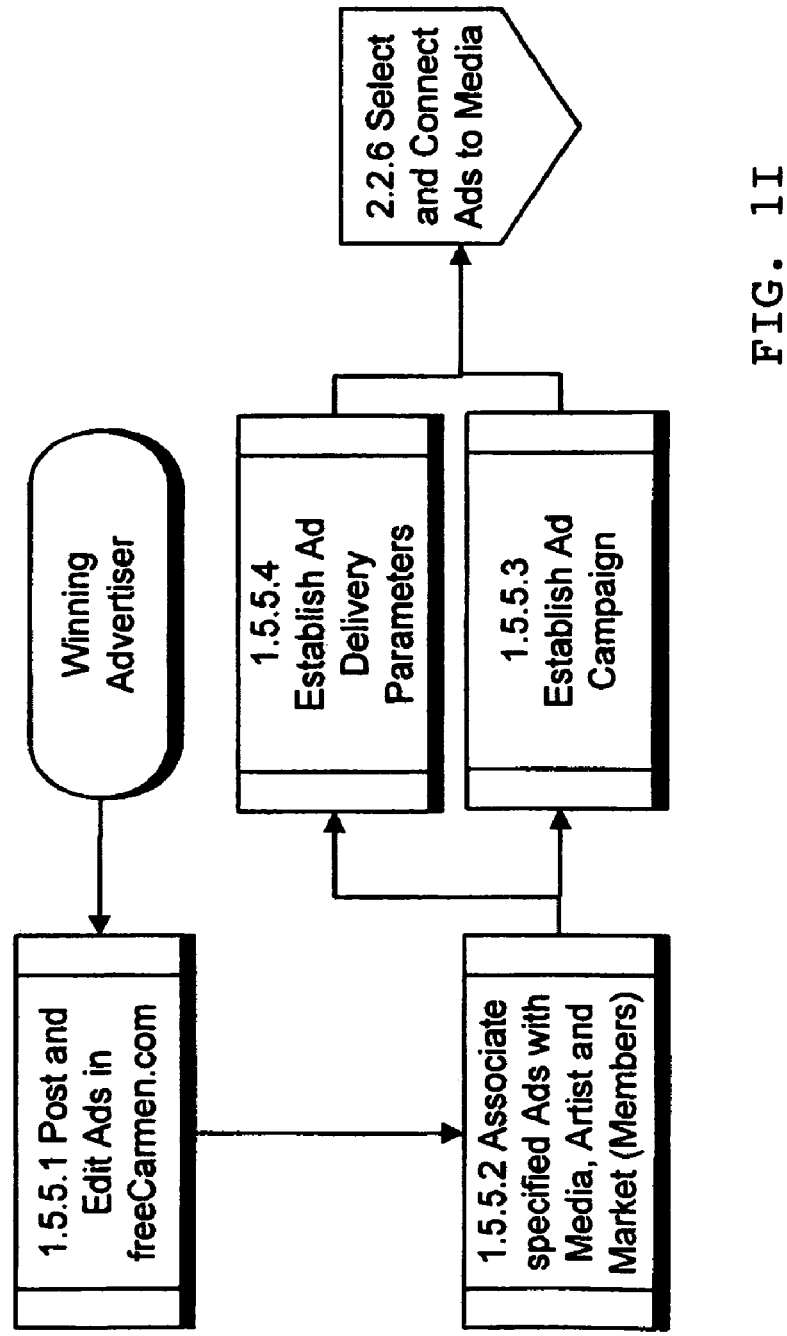

ELECTRONIC MEDIA DOWNLOAD AND DISTRIBUTION USING REAL-TIME MESSAGE MATCHING AND CONCATENATION

This application a) claims the benefit of U.S. Provisional Patent Application No. 60/757,613 filed Jan. 11, 2006, U.S. Provisional Patent Application No. 60/744,515 filed Apr. 10, 2006, and U.S. Provisional Patent Application No. 60/862,752 filed Oct. 24, 2006, and b) is a continuation-in-part of U.S. patent application Ser. No. 11/531,229 filed Sep. 12, 2006 now abandoned, which claims the benefit of U.S. Provisional Patent Application No. 60/757,613 filed Jan. 11, 2006 and U.S. Provisional Patent Application No. 60/744,515 filed Apr. 10, 2006, each of which is incorporated herein by reference in its entirety.

BACKGROUND OF THE INVENTION

A problem in the music download industry is that the cost and difficulty of downloading from legal sites are driving consumers to illegal music download sites. Advances in Internet, computer hardware, and software technologies have made it easier for users to find and illegally download copyrighted digital materials.

Some existing methods include legal music download services that charge a fee per download or a subscription free, legal media streaming services that charge a subscription fee to stream selected media to users' computers, sites that broadcast free media over the Internet sponsored by advertisers, and illegal download sites.

The words "media" and "download" are used to refer to any digitized content that can be stored in computers, and transmitted over the Internet. This includes digitized music, movies, music and other types of videos, e-books, audio books, e-magazines, and any other digital content that is copyrighted or not.

Today's consumers, armed with broadband Internet access, have a need to download and carry their media with them on portable devices, such as Apple's iPod and other mp3 file players.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 1.1 is a flow diagram showing the copyright holder registration process, according to an embodiment of the invention.

FIG. 1.2 is a flow diagram illustrating the media posting and sponsor selection process, according to an embodiment of the invention.

FIG. 1.3 is a flow diagram showing the interaction between members, advertisers, and copyright holders, according to an embodiment of the invention.

FIG. 1.4 is a flow diagram showing the advertiser registration process, according to an embodiment of the invention.

FIG. 1.5 is a flow diagram showing the steps involved in the sponsor selection bidding process, according to an embodiment of the invention.

FIG. 1.5.5 is a flow diagram depicting a process to post advertisements and establish an advertising campaign, according to an embodiment of the invention.

FIG. 2.1 is a flow diagram depicting the member registration process, according to an embodiment of the invention.

FIG. 2.2 is a flow diagram illustrating the member media request and download process, according to an embodiment of the invention.

FIG. 2.2.6 is a flow diagram showing a process to select and connect advertisements to media, according to an embodiment of the invention.

FIG. 2.3 is a flow diagram illustrating the media version monitoring and replacement process, according to an embodiment of the invention.

FIG. 3.2 is a block diagram showing the architecture of a web server system, according to an embodiment of the invention.

FIG. 3.3 is a block diagram showing the steps that take place within a web server when a user requests digital content, according to an embodiment of the invention.

FIG. 3.4 is a flow diagram showing the steps that take place within a web server when a user requests digital content, according to an embodiment of the invention.

FIG. 3.5 is a block diagram illustrating how DRM encodes the file to be delivered to the user, according to an embodiment of the invention.

FIG. 3.6 is a block diagram illustrating how DRM encodes and decodes the packaged files, according to an embodiment of the invention.

FIG. 3.7 is a block diagram showing the architecture of the content play device, according to an embodiment of the invention.

FIG. 3.8 is a flow diagram depicting what happens on the client side during profile-driven advertising, according to an embodiment of the invention.

FIG. 3.9 is a flow diagram depicting what happens on the client side during event-driven advertising, according to an embodiment of the invention.

DETAILED DESCRIPTION

Figure 1:
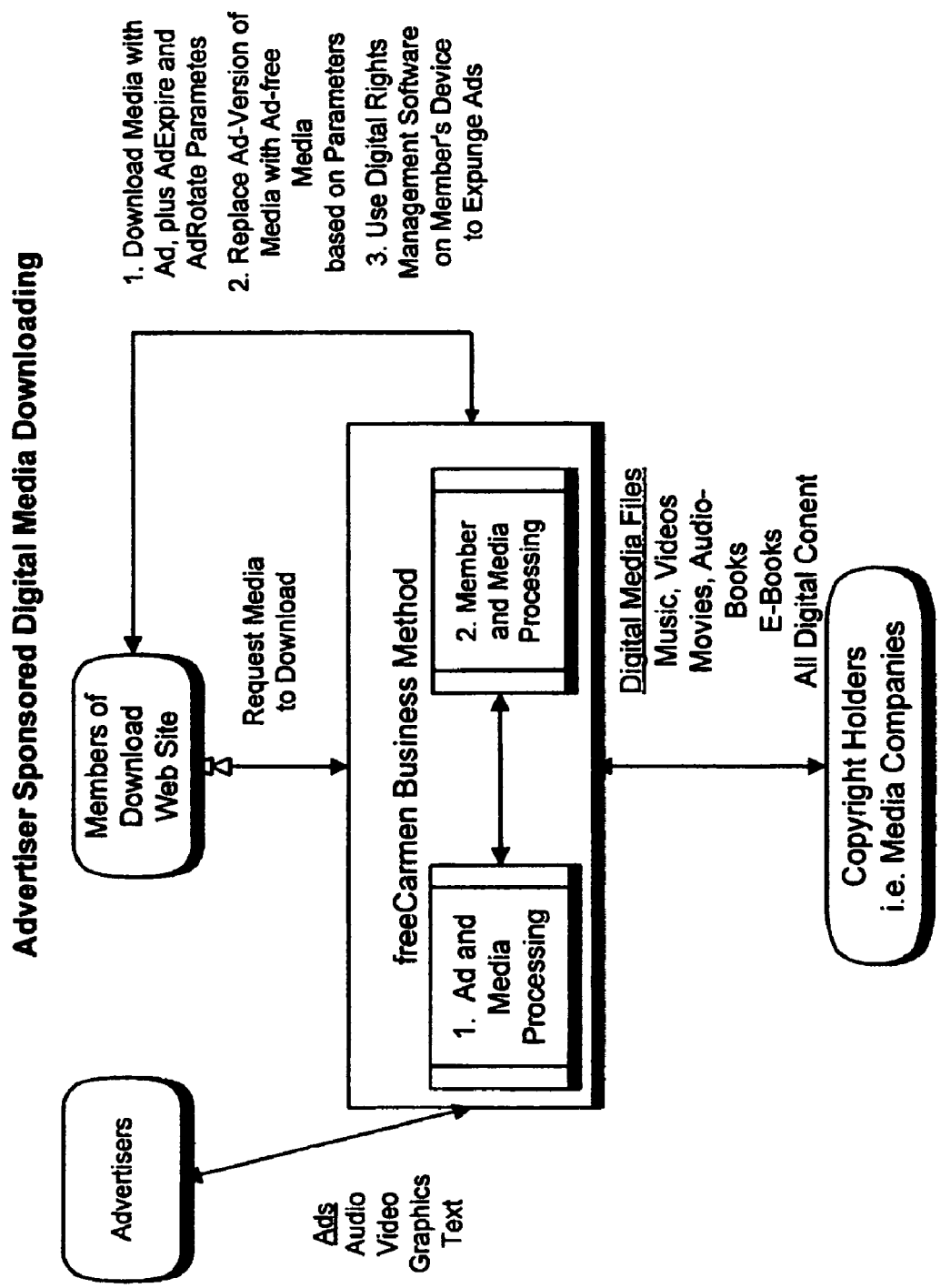
FIG. 1 is a block diagram illustrating a system according to an embodiment of the invention.

While preferred embodiments of the present invention have been shown and described herein, it will be obvious to those skilled in the art that such embodiments are provided by way of example only. Numerous variations, changes, and substitutions will occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

An embodiment of the invention uses the Internet and other hardware, software, and networking technologies to offer advertiser sponsored legal download of music, movies, audio books, e-books, and other digital copyrighted and un-copyrighted media.

An embodiment of the invention is directed to a method of allowing sponsored user download of digital content from a web server. Copyright holders, such as media companies, post digitized content to a web site and indicate a minimum price that must be paid per download. A minimum price may be based on a share of revenues that sponsors offer to sponsor downloads. Sponsors, including advertisers or various for profit and non-profit organizations, post advertisements in various formats, and bid to sponsor a download, or agree to sponsor downloads based on pre-arranged advertising fees they agree to pay. Sponsors may choose to sponsor downloads for particular users, songs, artists, or events. Sponsors may also specify advertisement preferences, such as where in the content the advertisement will play and what causes it to expire.

Users may register as members of the system (for example, through a web site) and request to download sponsored digital content free of charge. When they register, users fill out a user profile. When users obtain content from the system, additional content may be appended to the requested content. This additional content may be targeted to the user based on various factors. For example, in an embodiment, the additional content may comprise an advertisement. Thus, examples herein described with respect to advertisements may also be applied to other forms of additional content other than advertisements. In an embodiment, after users make a request for content, an algorithm finds and appends one or more targeted advertisements depending on the sponsor preferences and bids. The targeted content (such as advertisements) may be selected according to various criteria, for example, based on, individually or in various combinations: the user's profile, past usage patterns, navigation pattern leading to the request for content, the specific content requested, and other factors that may contain information about the user's preferences in general. These criteria may be determined at, or near, the specific time of the request for content according to various embodiments. Users receive a packaged file containing the requested digital content and possibly containing advertisements, which may expire after a set period of time or based on algorithmic pre-programmed events. When the transaction is completed, sponsors deliver advertisements to a target audience and pay a fee for advertising, part of which goes to compensate the copyright holders. Users initially own downloaded files that contain advertising until the advertisements expire, and then have only the requested digital content free of charge.

FIG. 1 depicts a block diagram illustrating the overall business method system, according to an embodiment of the invention. As the diagram shows, copyright holders, such as media companies, post digitized copyrighted (or otherwise) materials to the system web site. As they post the files, they also indicate a minimum price, or share of advertising revenue that copyright holders must be paid for each download.

Sponsors, which include but are not limited to advertisers, government organizations, and non-government organizations, post advertisements in audio, video, graphics, and text formats. They also indicate how much they are willing to pay to sponsor a media file download to have their advertisements included in the media files that are delivered to consumers. Note that certain types of sponsors, such as charities, governments and non-government organizations, may choose to simply sponsor downloads for certain types of members, without asking to deliver any advertisements. For example, a charity that supports inner-city youth may sponsor free downloads for members who are verified as inner city youth. Likewise, a church may sponsor free downloads for its members, or any audience they choose to identify as their target audience.

To be able to download sponsored media, digital consumers become members of the system's web site. After becoming members, they can request to download sponsored files free of charge. If files requested by members are sponsored, they will download the sponsored version of the desired files, which may contain advertisements. The files containing advertisements are time-stamped and programmed by the system, which allows the system web site or a special software residing on the member's device, to automatically play, rotate, and expunge the advertisements from the downloaded files after a waiting period specified by the advertiser. Other conditions that control the rotation, playback, and expiration of additional content (such as advertisements) automatically may be programmed as well. These conditions can be based on endogenous and exogenous factors. The factors may include, individually or in various combinations: information in a user's profile, other music and media files the user owns or has looked for in the past, and/or any other relevant information that can be derived from user's interaction with the system over some period of time, user's real-time location, for example as provided by GPS on the user's media player device, real-time weather, traffic, travel, news, and/or any other real-time information that was delivered via Internet or other connection to the user's media player device. When the transaction is completed, the sponsor (advertiser) delivers advertisements to his target audience (members) and pays a fee for advertising. A portion of the fees paid by the sponsor is used to compensate the copyright holder for the downloaded files. The members initially download files that contain advertising, and after a certain period of time or satisfied conditions, when the advertisements expire or are expunged, they have use free of charge of a version of the file that plays without advertisements.

Alternatively or concurrently, the sponsor may chose to simply play its advertising in the member's Internet browser, in one embodiment in an area that also displays the progress of the download, while the member is downloading the sponsored media file. Since most media files are multiple megabytes in size, and it could take anywhere from 5 seconds to minutes to download the file, sponsors can chose to deliver their advertising during this period. According to various embodiments, the advertisements may be audio, video, text, hyperlink text, graphics, and any other media viewable on the user's media player device.

Media files downloaded, for example, from a system web site, can be shared legally either with other registered users, or users of file sharing networks such as Kazaa, Limewire, or other networks according to various embodiments. As other users attempt to download files from computers of others, the transaction may be intercepted, and advertisements may be applied to the files being downloaded. A system web site or other technology may apply the advertisements.

An embodiment includes two major processes. The first is advertisement and media processing, which includes all the major functions involved in posting media and advertising. Furthermore, it describes a bidding engine, which determines the economics of delivering advertisements with media, and links them for download upon member request.

The second process is member and media processing, which registers members as authorized users of the system, allows the members to request media downloads, packages requested media with appropriate advertisements, and downloads the digital packages to a member's device.

Figure 1B:
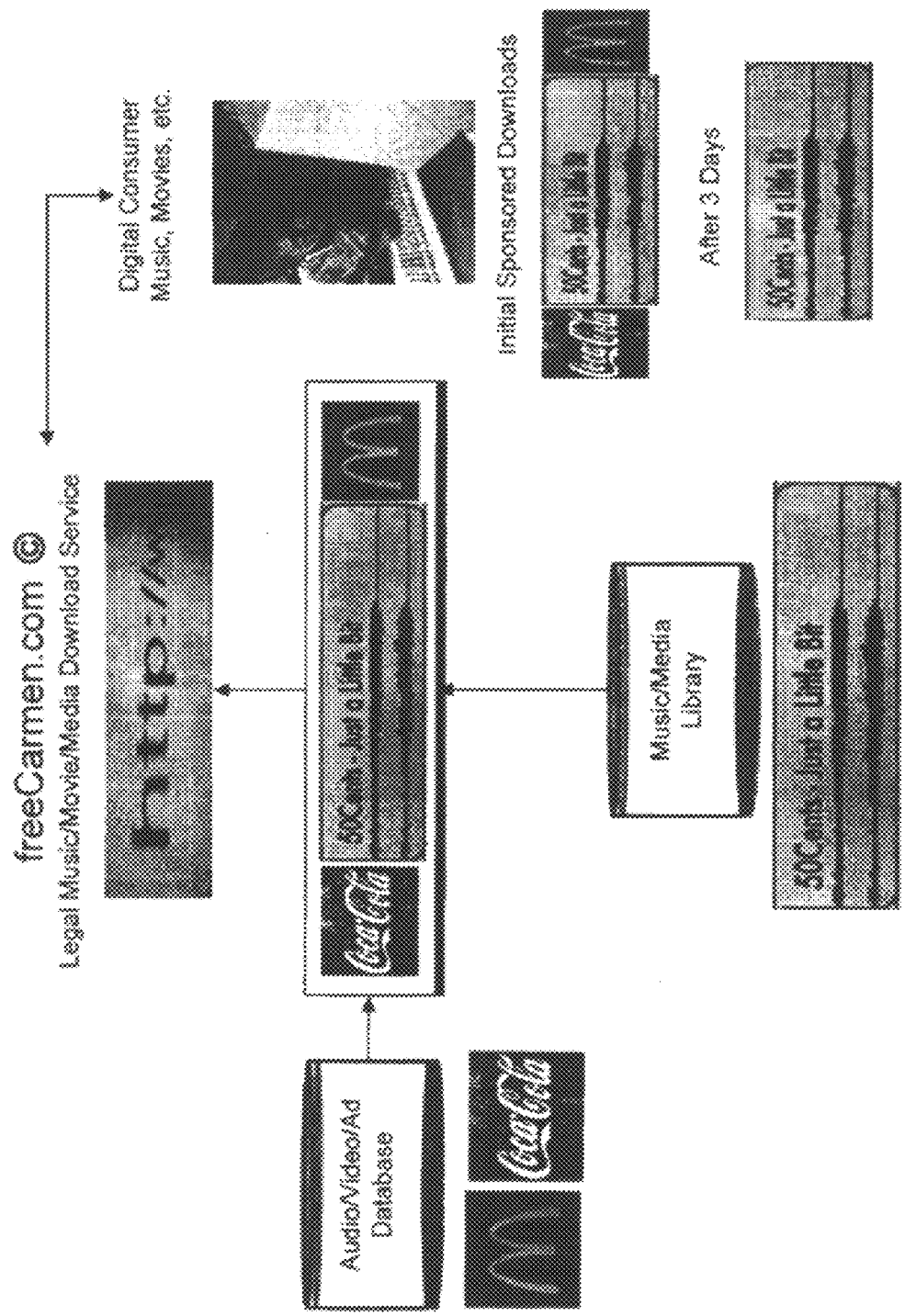
FIG. 1B is a block diagram showing an example of how an embodiment works at a high level, according to an embodiment of the invention.

FIG. 1B is a block diagram showing an example of how an embodiment works at a high level, according to an embodiment of the invention. One embodiment of the present invention allows the system to interact with the member to deliver content to the member.

An ad-version is an instance of the file that typically plays with an advertisement (which may depend on various factors). An ad-free version is an instance of the file that plays without an advertisement. Whether an instance is an ad-version or ad-free version may be implemented according to various approaches. For example, a flag may indicate whether an instance is an ad-version or ad-free version. Thus, bypassing, expunging or deleting an advertisement may comprise setting a flag to allow the file (e.g., song) to play without the advertisement according to an embodiment. Alternatively, the advertisement may be skipped or expunged in other ways according to other embodiments. Note that according to various embodiments, the technology herein described with respect to advertisements may be applied to additional content other than advertisements. Thus, according to an embodiment, the principle of an ad-version may apply to a version with or which plays with such additional content, and an ad-free version may apply to a version without or which plays without such additional content.

In this example, a member of the system requests a song by a particular artist. The system identifies two advertisers who would like to sponsor the download by having their audio advertisements delivered to the member along with the song. The system then connects an advertisement by a particular advertiser (e.g. McDonalds) to the beginning of the song, and another by advertiser (e.g. Coca-Cola) to the end of the song, thus creating the ad-version of the song in mp3 or encoded format. The member initially gets a legal download of the ad-version of the song with a time-stamp and additional advertisement rotation and playback parameters. Subsequently, the system monitors the time-stamp or rotation and expiration parameters of this download, and after a particular period of time (e.g. 3 days, or longer or shorter period), it replaces the ad-version of the song or upon satisfaction of expiration parameter conditions, it automatically expunges the advertisements, leaving the user with a free, legal, ad-free version of the song. The following sections provide detailed description of the system's processes and sub-processes.

Figure 1C:
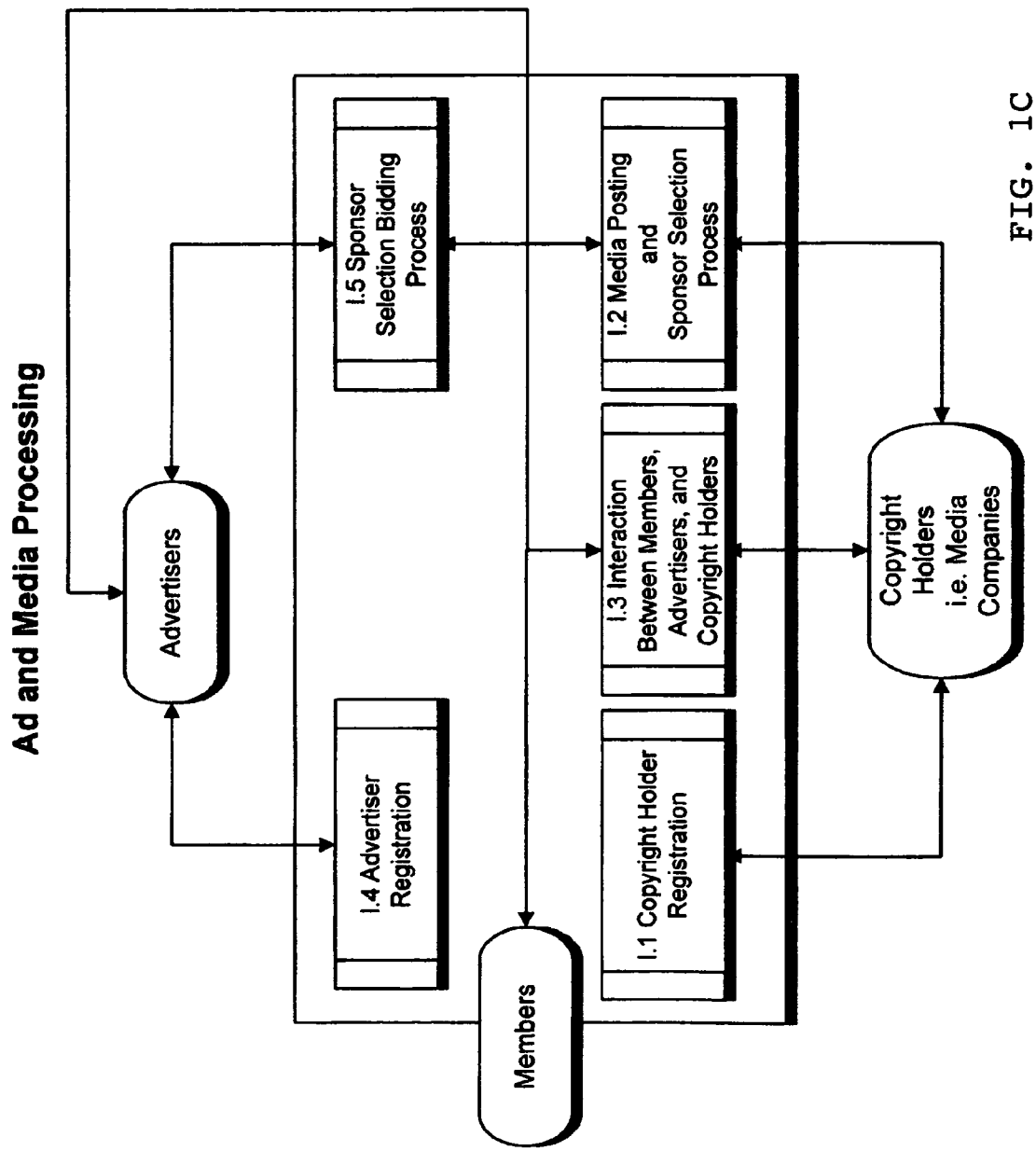
FIG. 1C is a block diagram depicting an overall advertisement and media processing system, according to an embodiment of the invention.
Figure 1D:
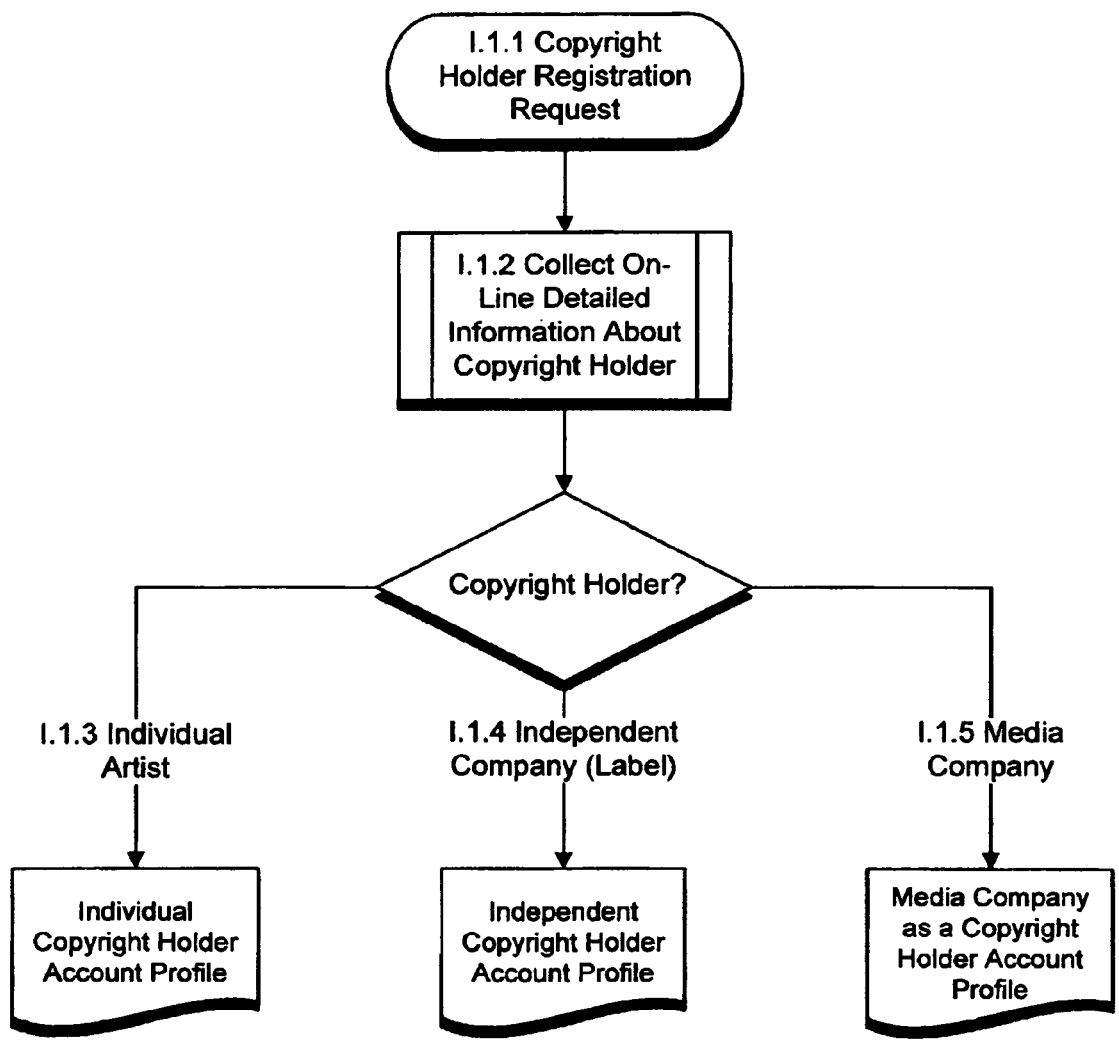
Figure 1E:
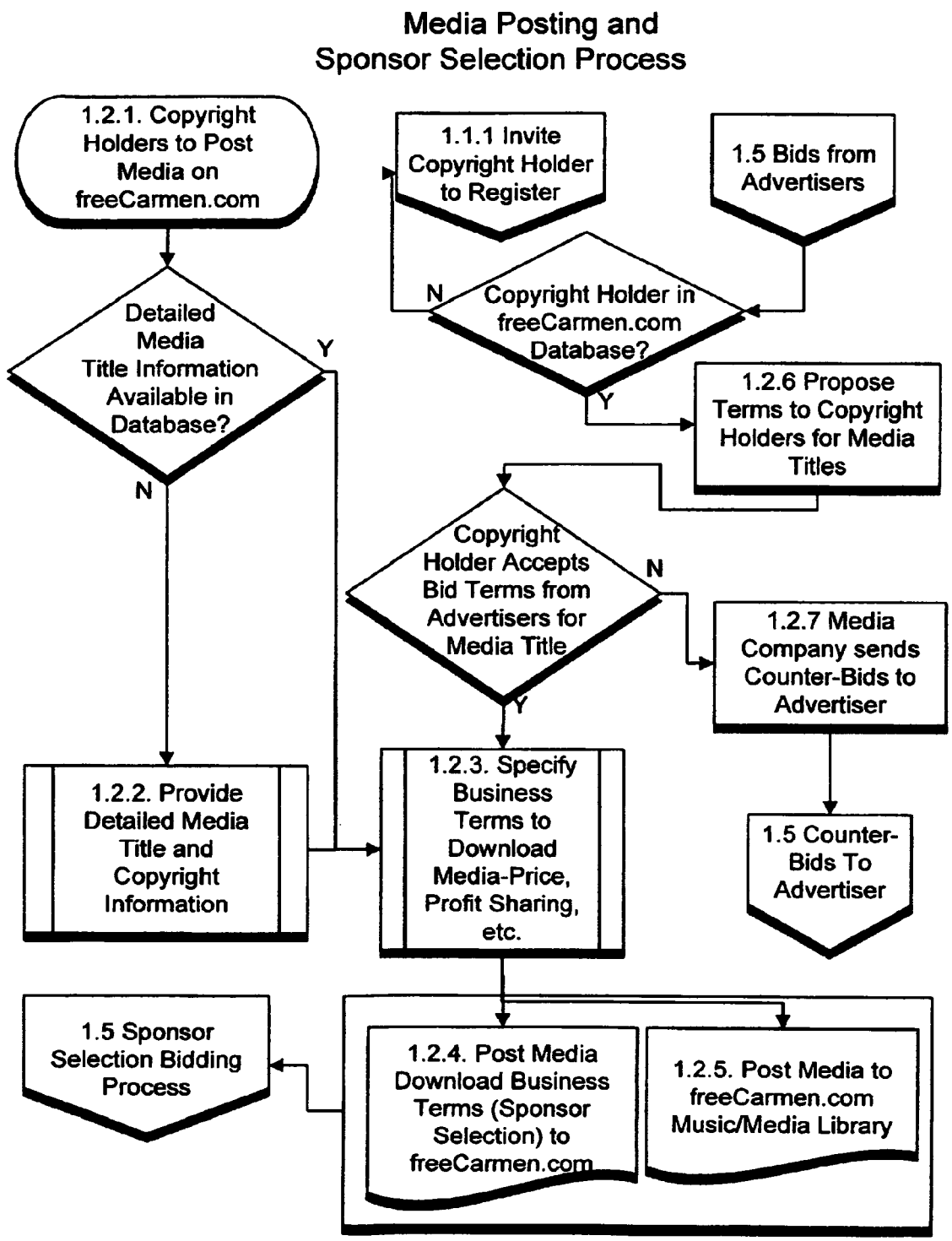
Figure 1F:
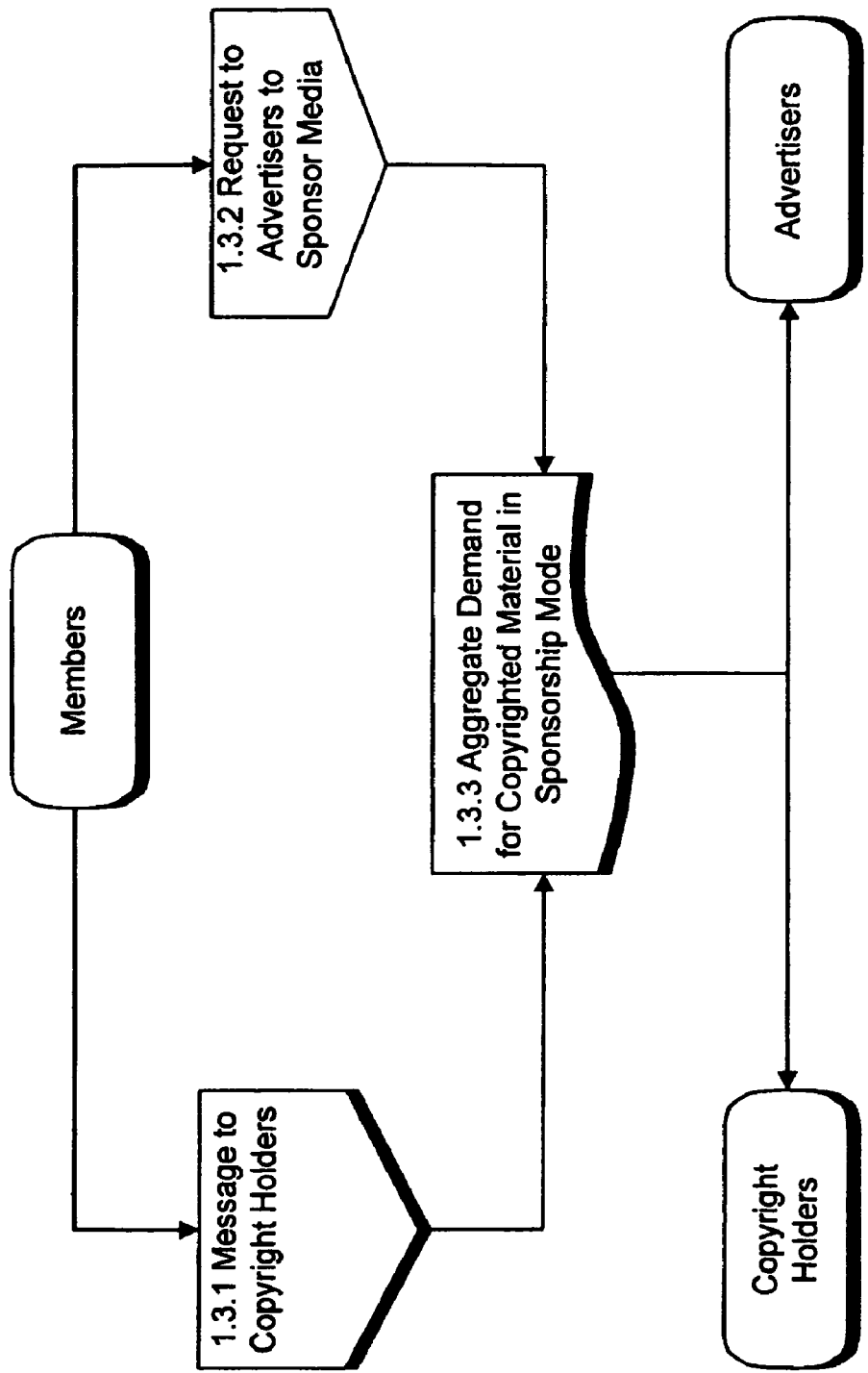
Figure 1G:
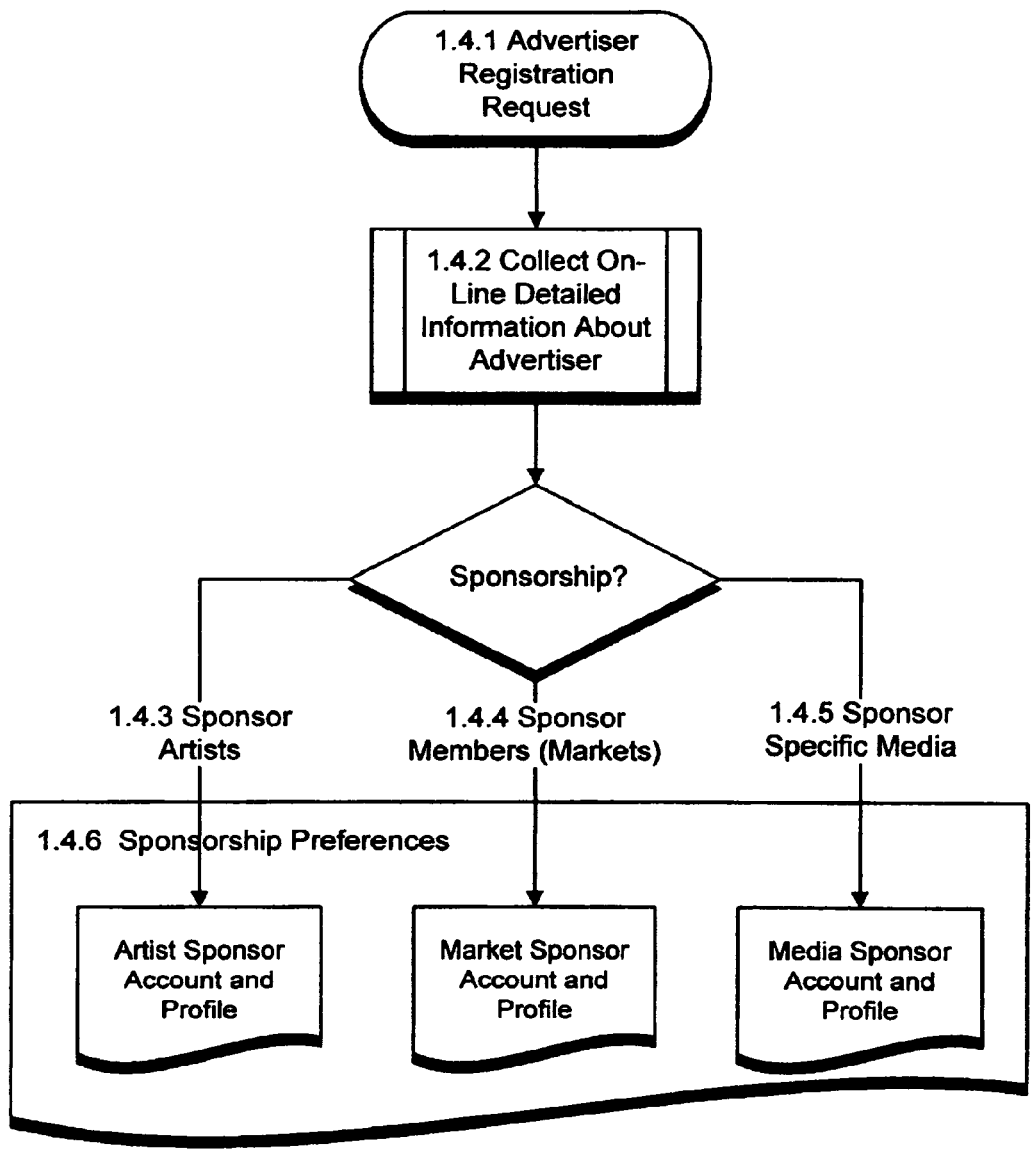
Figure 1H:
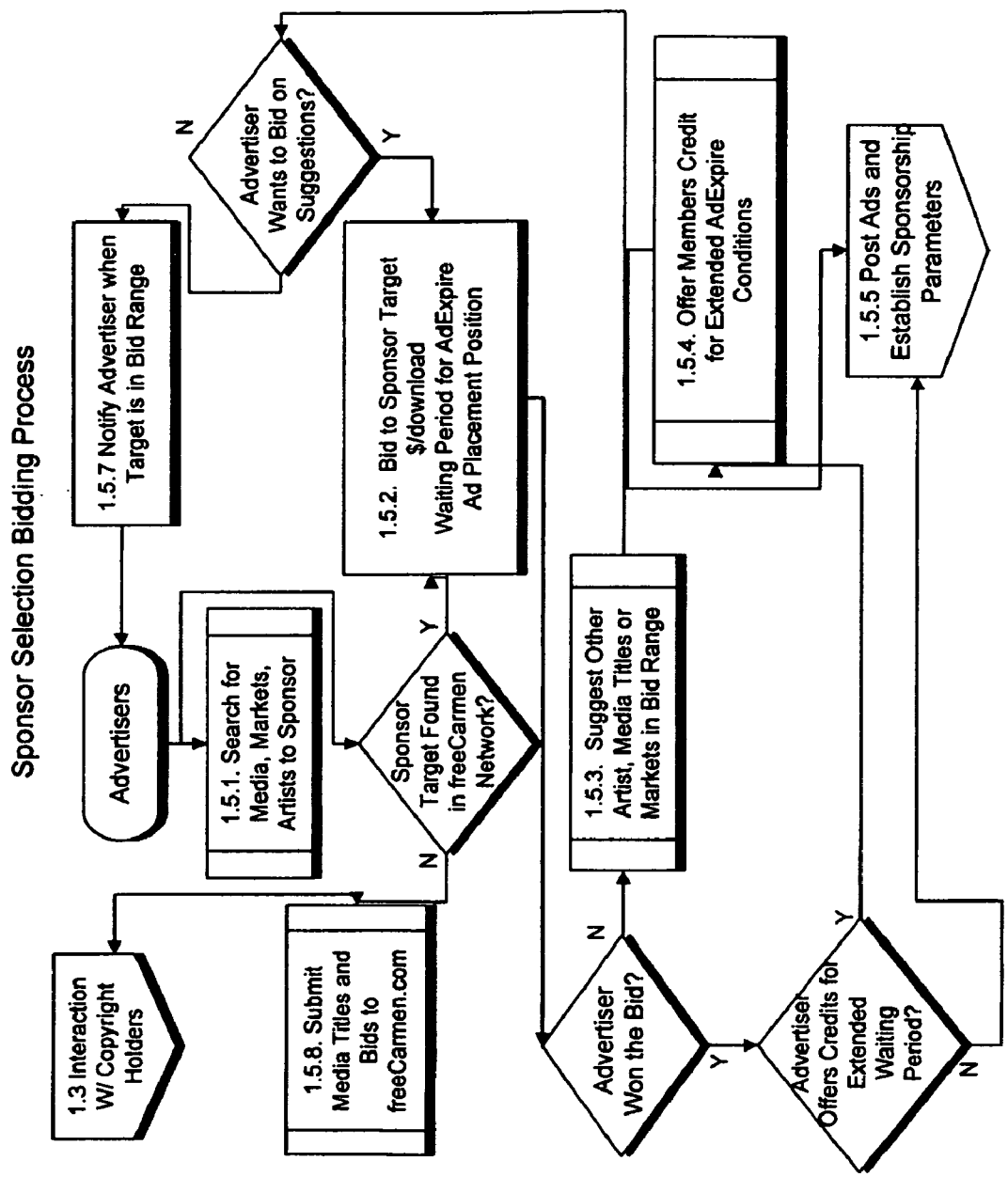

FIG. 1C is a block diagram depicting an overall advertisement and media processing system, according to an embodiment of the invention. The copyright holders and advertisers post content and advertisements.

FIG. 1.1 is a flow diagram showing the copyright holder registration process, according to an embodiment of the invention. In order to post content, a copyright holder registers with the system. This process allows copyright holders of all types of digital media, including music, movies, videos, e-books, audio-books, magazines, lectures, seminars, etc., to register with the system website as a provider of digital media available for sponsored download or outright sale. Sponsored download means allowing members of the site to download copyrighted materials which include advertisements by advertisers, or sponsors, who pay fees that cover the price asked by copyright holders.

Copyright holders can visit the system web site and request to register as a provider of digital media for sponsored downloads. Copyright holders provide detailed information about the entity or entities that own copyrighted materials. This information includes name, address, contact information, and types of media the entity would like to make available for sponsored downloads. Copyright holders also agree (electronically) to the terms and conditions of making their media available for sponsored downloads.

Copyright holders identify themselves as individual artists, independent media companies or major media companies. Complete profile information is then provided based on the type of registration requested. Upon the conclusion of this process, copyright holders are provided with user names and passwords that allow them to access the system web site.

FIG. 1.2 is a flow diagram illustrating the media posting and sponsor selection process, according to an embodiment of the invention. After copyright holders are registered, they may upload content and sponsors are selected. Registered copyright holders post media to the system web site to make them available for sponsored downloading. First, copyright holders are invited by advertisers and/or members to post their media on the system web site. Copyright holders can also post their media without being prompted. If the system media database does not already contain detailed information, it is provided in this step. Information collected in this step includes the title of media (including version), author or artist, type of media (i.e. movie, music, etc.), digital format of media (i.e. mp3 or acc, mpeg, pdf, etc.), and size of media (in kilobytes or megabytes).

The copyright holder can specify the business terms for sponsored downloading by genre, artist/author, media title, or other criteria (step 1.2.3). The business terms may include the minimum price the copyright holder must receive to allow for sponsored downloading of a media title, the share of profits copyright holder can specify, and any restrictions the copyright holder may place on the usage and further distribution of media.

After specifying media titles and associated business terms, a copyright holder may post the business terms on the system database (step 1.2.4).

In a separate step, copyright holders upload digitized versions (in formats specified in 1.2.2) of their media to the system database. Advertisers use this information provided in step 1.2.4 to bid on sponsoring media. Members search and download from the music/media library where copyright holders post their media in step 1.2.5.

In some instances, members may request a specific media title that a copyright holder has not posted in the system database. In this case, using the bidding process (for example, as described in FIG. 1.5), an advertiser can submit a bid for the media title. If the system does not have information about the copyright holder of the media title in question, an invitation will be sent to the copyright holder, with relevant information indicating overall interest in the media title, to register with the system web site and post the media title in question (step 1.1.1).

If a copyright holder is registered, but the media title it owns is not posted, the system web site allows the advertiser to propose a business term to the copyright holder to induce it to post the media title in question. The copyright holder can agree to the terms, and carry on to steps 1.2.3 and beyond, or in step 1.2.7, send a counter-bid to the advertiser. This process can repeat until an agreement is reached.

Members, copyright holders, and advertisers interact with each other to facilitate processes. They interact when copyright holders ask advertisers to sponsor their media for sponsored downloading. Also, copyright holders perform market research for the media by gauging interest from members for sponsored downloads, and advertisers, for sponsoring at different price points. Members ask copyright holders to post desired media titles for sponsored downloading. Advertisers propose sponsorship for media title, artists, authors, or combination thereof to copyright holders. Members rate advertiser advertisements, allowing advertisers to fine-tune their advertisements for effectiveness and value to members. Furthermore, members rate media, allowing advertisers to select targets for sponsorship (media, artists, authors, etc.).

FIG. 1.4 is a flow diagram showing the advertiser registration process, according to an embodiment of the invention. This process allows advertisers to register at the system web site as sponsors for media downloads. Advertisers provide detailed information about the entities they represent, including advertiser entity and contact information, advertiser target audience demographics, and advertiser target audience profiles which are used to match advertisers with the system's members based on the profile of members, their media consuming patterns, and other activities that signify preferences.

In steps 1.4.3-1.4.5, advertisers specify their sponsorship preferences. They can choose to sponsor specific artists and authors, specific markets based on member profiles, and/or specific media titles. In step 1.4.6, advertisers create accounts and record their preferences for sponsorship. At the conclusion of the process shown in FIG. 1.4, advertisers are given user names and passwords that allow them to access the system web site and all of its capabilities as they apply to advertisers.

FIG. 1.5 is a flow diagram showing the steps involved in the sponsor selection bidding process, according to an embodiment of the invention. Once they are registered, sponsors may bid to sponsor requests to download content. This process defines how advertisers post advertisements in the system's advertisement database, bid to sponsor media, and upon winning the bid, specify advertisements that are to be delivered with the media. Furthermore, advertisers establish advertisement delivery parameters that direct the specifics of advertisement placement, consumption by members, and ultimate deletion of the advertisements from sponsored media.

Registered advertisers may use the system web site's search capabilities to search for targets to bid on as sponsors. Advertisers can search based on several criteria. One such criteria is the media title. Sponsoring a media title means that every time a member requests to download a media title, the advertiser that is identified as the sponsor of this media title has the right to have its advertisements connected to the media title in question, and the package delivered to the member. For example, a registered advertiser can search for the song "Silent Night" by the artist, Bing Crosby. When the media title is found in the system's network (web site system's database or other members' computers in P2P mode), the advertiser can choose to sponsor this title (through a bidding process). Once its sponsorship is established, every time a member attempts to download this title, the system will attach the sponsor's advertisements to the media and deliver the package to the member.

Advertisers may also search by artist or author. Advertisers can choose to sponsor all the works of an artist or an author, or a category of their works as defined by genre, dates of release, version, format, or other criteria. In this case, any media title by the artist or the author in a given category is associated with the sponsor of that category.

Advertisers may target specific markets. Advertisers can also choose to sponsor downloads by certain members, or category of members based on their profiles and on-line usage and activity patterns. For example, advertisers can search the system's member database for all members who are in the 13-18 year age group, who have Chinese heritage, and are female. Sponsoring this market means that any member of this group who downloads sponsored media will also receive advertisements by the advertiser who chose to sponsor this group of members as a target audience or market.

If the system's music/media database does not contain the desired media titles or artists/authors, advertisers can submit requests to the system, through the interaction process defined in 1.3, to invite the copyright holders to post the media titles and the works of the artists/authors in question (through step 1.5.8), to the system web site for sponsored downloading.

Advertisers bid to sponsor their desired targets as defined in 1.5.1. The bidding process is facilitated by the functions of the system web site, that allow for on-line viewing of minimum bids, existing bids by other advertisers, and the amounts and conditions that must be bid to win the rights to sponsor the target in question.

Advertisers submit certain information during the bidding process. Such information includes fees (in dollars and other currencies). Fees are how much an advertiser is willing to pay to sponsor each download of a media title.

Advertisers also submit information about the waiting period (condition) and other conditions. This is a time period that a member who downloaded the ad-version of media must wait, before the ad-version is replaced by the ad-free version of the media. For example, an advertiser can specify that a member must consume the ad-version of the media for 5 days, before an ad-free version of the media is made available to the member. Other conditions may include promotions, revenue targets, and other events that allow advertisers to expire their advertisements faster.

Advertisers also specify advertisement placement (condition). This is a physical location in the media into which the sponsor wants to insert its advertisements. For example, the advertiser can choose to have a 5 second audio advertisement placed at the beginning of a song (in mp3 format), thus making sure that the consumer listens to its advertisement every time before the song starts playing. Advertisements can have various placement alternatives depending on the media type.

There are several placement alternatives according to different embodiments of the present invention. For mp3 music an advertiser may choose to place audio advertisements in the beginning and/or end of the song. For mpeg movies, TV shows, and other videos an advertiser may place video advertisements in the beginning, end, and anywhere in-between. For audio books advertisers may place audio advertisements in the beginning, end, and anywhere in-between. For e-books an advertiser may place text/graphics advertisements in the beginning, end, and anywhere in-between.

The bidding process may produce more than one winner per target based on the placement preference of the advertisers. For example, one advertiser may win the bid to place its advertisements in the beginning of Bing Crosby's "Silent Night," and a second advertiser may win the bid to place its advertisements at the end. For digital television shows, a dozen advertisers may win sponsorship positions in different placement locations of the show.

The bidding process ends in the selection of advertisers as sponsors for targets. The criteria used to establish the winning advertisers can be modified based on the minimum fee requirements imposed by the copyright holders, and the system's profit objectives.

If an advertiser wins the bid for the target in question, the advertiser can then choose to offer download credits to members who download the sponsored media. For example, the winning bid may subject the members who download Bing Crosby's "Silent Night" to a waiting period of 3 days before the ad-version of the song is replaced with the ad-free version.

Every time a member attempts to download the song, the advertiser can offer waiting period credits, such as 10 cents for every additional day the member chooses to keep the ad-version of the song, beyond the initial 3 days. If the member chooses to accept the waiting period credit, the member's account will be credited by 10 cents for every additional day. The member can then choose to spend accumulated credits to download another song that does not have sponsors, and could not, otherwise, be downloaded for free, in a sponsored mode.

FIG. 1.5.5 is a flow diagram depicting a process to post advertisements and establish an advertising campaign, according to an embodiment of the invention. Sponsors may choose to post advertisements and create an advertising campaign. This process allows advertisers to post advertisements to the system's advertisement database, associate the advertisements with sponsored media (that they won through the bidding process), establish the advertisement delivery parameters which define the rotation (AdRotate), playback, and expiration (AdExpire) of the advertisements, and define a campaign.

During the first step, advertisers upload advertisements of their choice produced in digital formats that are appropriate for concatenation to media, and subsequent delivery. These advertisements are posted to a database, and associated with the advertiser's account, such that advertisers can have access to the advertisements for selection and connecting as described in FIG. 2.2.6.

In a subsequent step, advertisers associate posted advertisements with targets that they won for sponsorship through the bidding process. These associations are not permanent. Rather, they are active only during a period of time where the advertiser is still the winning bidder for the target in question. If another advertiser wins the right to sponsor the target, the system breaks the association, and allows the new winner to associate its own advertisements with the targets.

In a following step, the advertiser establishes the campaign parameters for advertising. The parameters include the maximum number of advertisement deliveries per period, per target (minute, hour, day, week, month, etc.) and the budget per period.

When the maximum number of advertisement deliveries is achieved for the target, the advertiser can either increase the number, or release the sponsored target to other advertisers with lower bids. For example, let's say that an advertiser chooses to sponsor up to 10,000 downloads of Bing Crosby's "Silent Night" per day as the winning sponsor for this song. When 10,000 advertisements are delivered in a day, the song is released to the next highest bidder to download during that day. The following day, "Silent Night" will reverse back to that advertiser until its advertisement delivery quota for the day is reached.

The budget per period can be established in terms of maximum expenditure delivering advertisements per day, or week, or any other time period. When the specified budget is exhausted during a period, the advertiser can either increase the budget, or release the sponsored targets to other advertisers with lower bids during that period.

In another step, advertisers establish the parameters that dictate the delivery of the advertisements, including where the advertisements are placed in the media, AdRotate parameters, AdExpire parameters which include the time period that a member who downloaded the ad-version of media must wait before the ad-version is replaced by the ad-free version of the media, and credits a member can earn by agreeing to a longer waiting period. AdRotate parameters allow the advertisers to establish conditions that the system can use to personalize and target advertisements based on endogenous and exogenous factors. For example, an exogenous factor such as the location of the user, as determined by GPS enabled media playback device, can be used to play a particular advertisement as a user is in proximity of a particular location. Another AdRotate parameter can instruct the system to play different advertisements with the same media file, if the user plays back the said media file more than once per day. AdExpire parameters can instruct the system to stop playing advertisements after a certain number of playbacks, after a certain period of time, or upon explicit instructions from the advertisers to stop playing advertisements.

Figure 2:
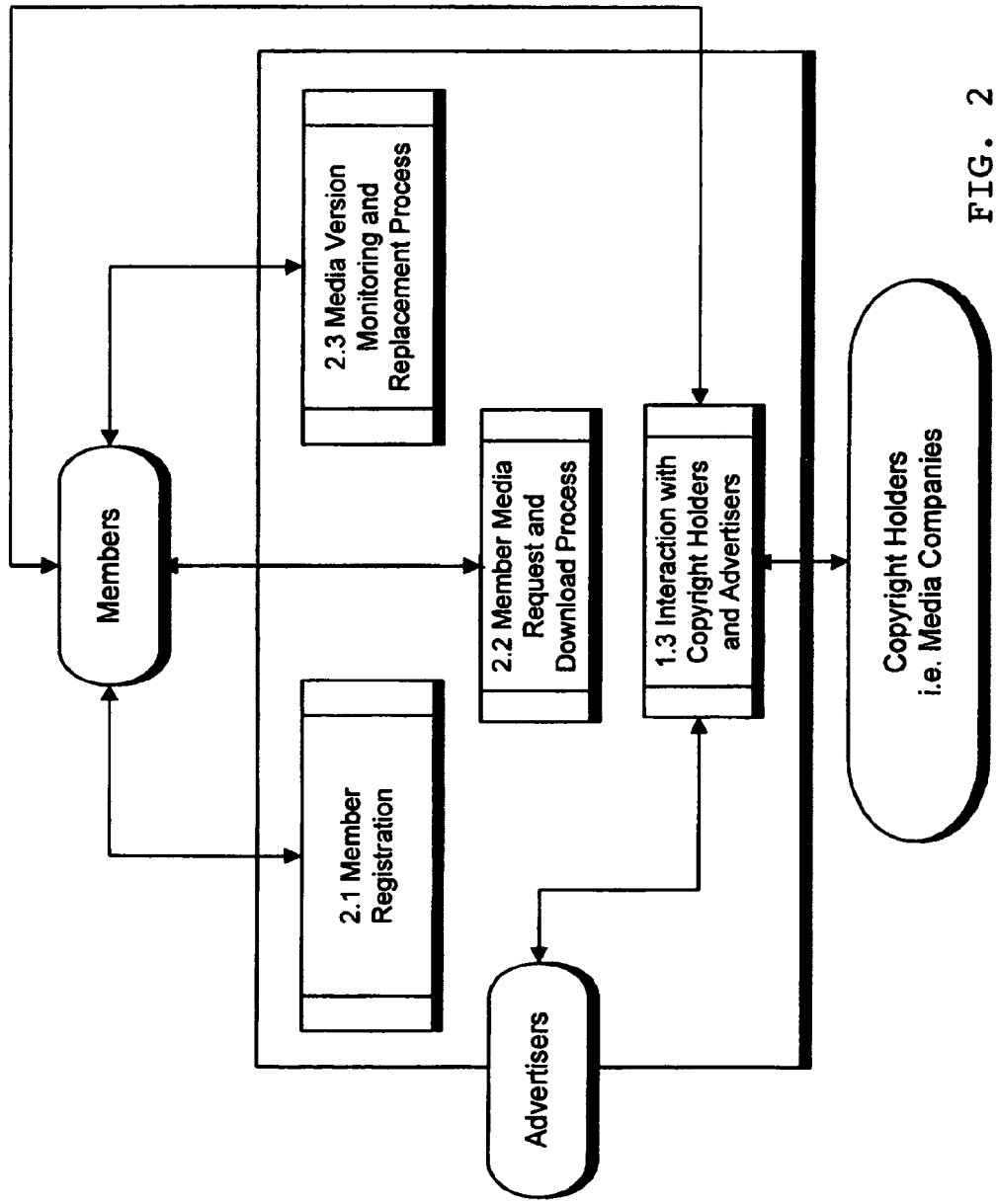
FIG. 2 is a block diagram showing the overview of member and media processing, according to an embodiment of the invention.
Figure 2A:
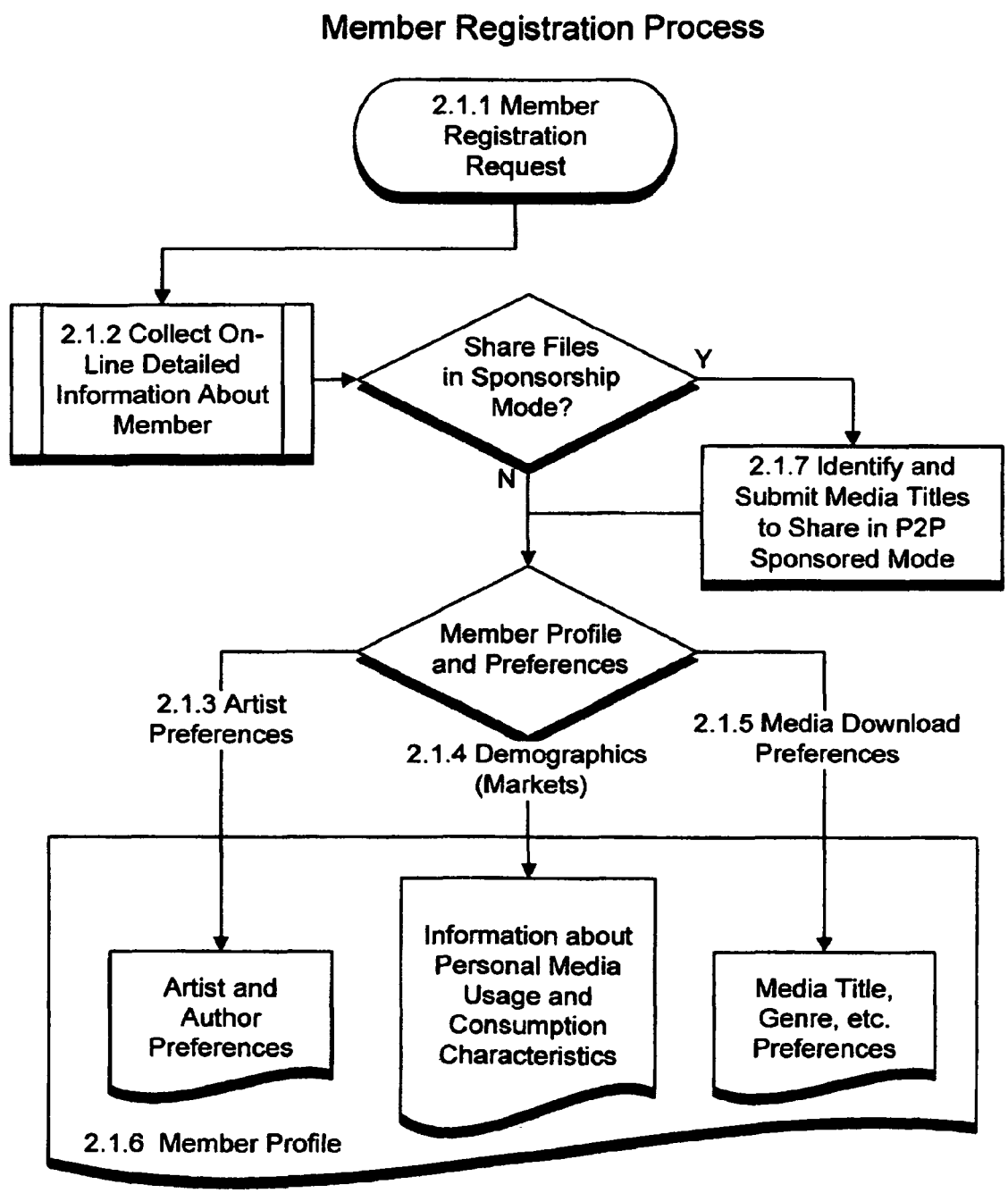
Figure 2B:
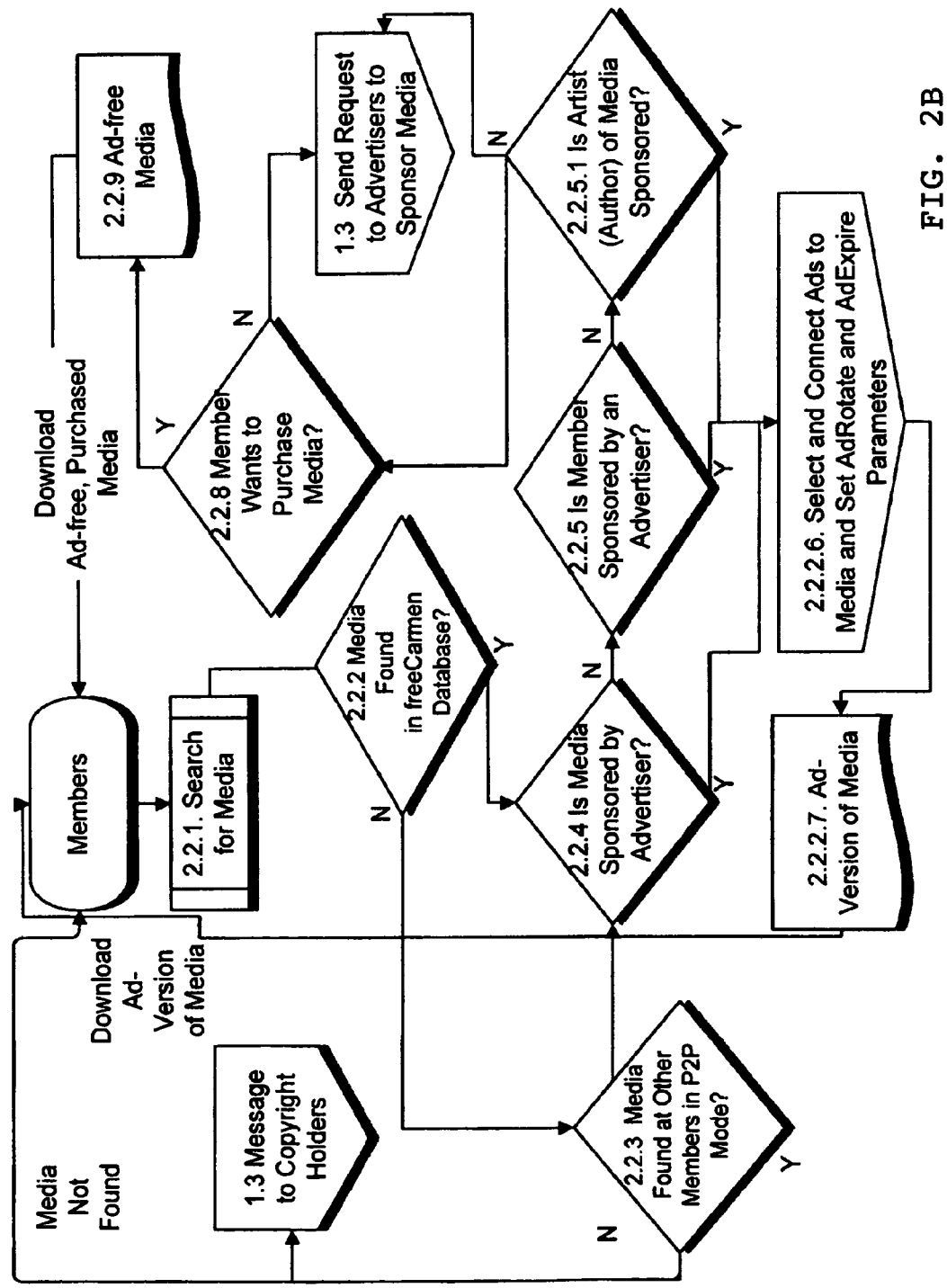
Figure 2C:
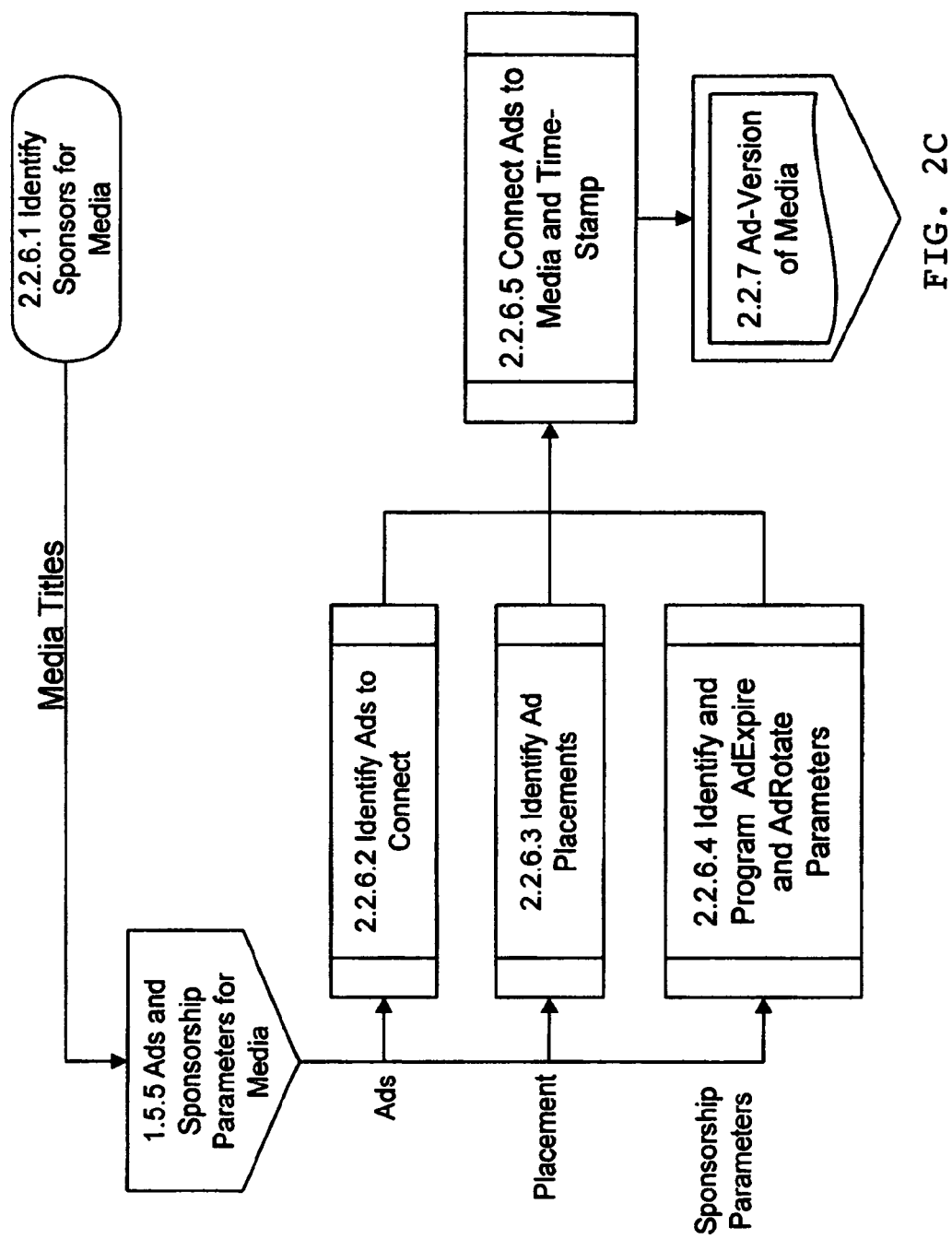
Figure 2D:
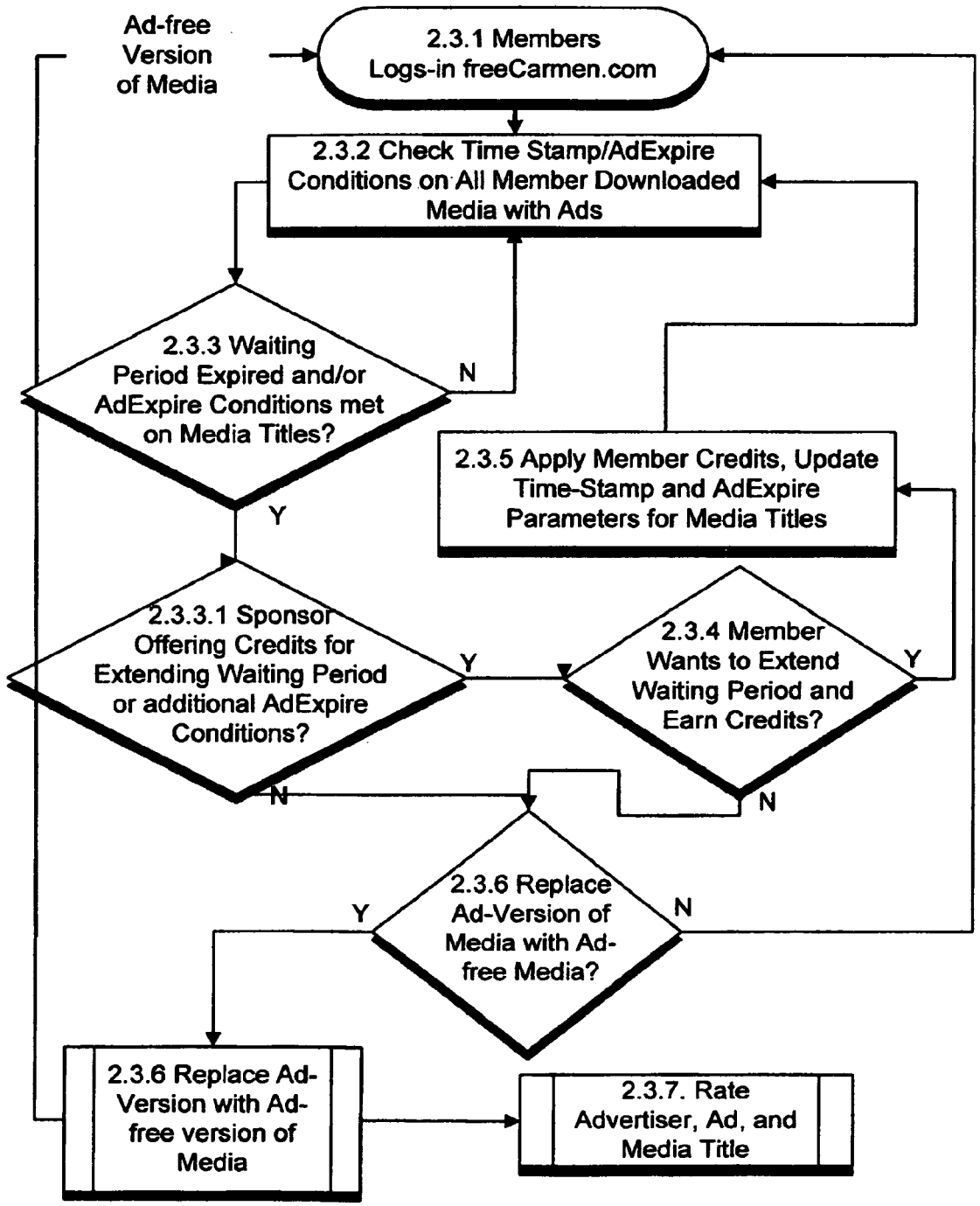

After completing the above processes, advertisers are ready to exercise the methods, some of which are shown in FIG. 2.2, which allows for automatic selection of advertisements and connecting of these advertisements to media.

If the advertiser does not win the bid for the target in question; the system web site will recommend other targets that are in the bid range (based on all bid conditions) of the advertiser. If the advertiser wants to bid on the suggestions, the bidding process (e.g. step 1.5.2 of FIG. 1.5) will be repeated.

If the advertiser does not want to bid on the suggested targets, the system web site will automatically notify the advertiser when its preferred targets become available in the original bid range. The advertiser will then exercise the process to bid on the desired target (for example as shown in FIG. 1.5).

FIG. 2 depicts a block diagram for the overview of member and media processing, according to an embodiment of the invention. The system delivers content to members who request content. This process registers members as authorized users of the system, allows the members to request media downloads, packages requested media with appropriate advertisements, and downloads the digital packages to members' devices.

FIG. 2.1 is a flow diagram depicting the member registration process, according to an embodiment of the invention. Before requesting content, members must register with the system. In this step, digital media consumers register at the system web site to become authorized members who can search and download sponsored media. The registration process records information about member's profile, file sharing preferences, and interests in digital media content (either surmised from their usage history or direct selection), such as types of music or movies, genre of audio books, etc.

A digital media consumer visits the system web site to register as a member. The system collects all relevant information about the prospective member, and establishes an account that contains all this information. At this point, the prospect becomes a member with a user name and password that the member can use to access and use the services of the system web site.

If the member wants to share media titles, the member stores on the member's local device in P2P (peer-to-peer search and download) sponsored downloading mode, and the member identifies all the files to share, and makes them available to the system's search capabilities.

The member is asked to provide information about the member's profile and preferences including artists and authors whose works the member is interested in. This information is used by the system to offer the member works of these authors and artists as they are made available for sponsored downloading. The member is also asked to provide demographic information such as age, sex, race, etc. This information is used by the system to allow advertisers to identify and sponsor media that are most popular with members in this demographic group. The member also provides information about media titles, genres, etc. This information is used by advertisers to determine what to sponsor in order to reach specific members with their advertisements. This information is also used by the system to offer sponsored media titles to members as they become available. All the information provided by the registered member is consolidated, organized and stored in the system member database for processing.

FIG. 2.2 is a flow diagram illustrating the member media request and download process, according to an embodiment of the invention. Once members have registered, they may request and download content. Members may use this process to search for sponsored media and download them to their device.

Members use keywords for artists, genres, media titles, or other search criteria to search for media that are available for download. If the media is found in the system's music/media database, then steps 2.2.4, 2.2.5, and 2.2.5.1 determine if the media is sponsored or not. If the media is sponsored, then in step 2.2.6 the sponsor's advertisements are connected to the media and the expiration (AdExpire), playback, and rotation (AdRotate) parameters are set and/or advertisement is time-stamped (details of this process are described later). In step 2.2.7 the ad-version of the media is downloaded to the member's device, along with all connected advertisements.

If in steps 2.2.4-2.2.5.1 it is determined that the media is not sponsored, then in step 2.2.8 the system gives the member the option of purchasing the media, and sends a message to advertisers to sponsor the media (using 1.3 process). The accumulated messages are aggregated and processed by the system to indicate "market interest" in the media in question. The member can purchase the media with money or accumulated credits. As specified in FIG. 2.3, members can earn credits for extending the waiting period or agreeing to more stringent AdExpire parameters on advertisements they receive with other sponsored media. If the member agrees to purchase the media, an ad-free version of the media is then downloaded on the member's device.

If in step 2.2.2 the requested media is not found in the system music/media database, then in step 2.2.3 the system checks to see if the requested media is available from other members, in sponsored P2P sharing mode. If the media is available in P2P mode, then steps 2.2.4-2.2.7 are exercised as above.

If the media in not available in P2P mode either, then a message is sent to the member that the requested media is not available for download. At the same time, through step 1.3 (which may include the actions of FIG. 1.3), a message may be broadcast to all copyright holders to post the requested media in the system and make it available for sponsorship and downloading. The system aggregates the messages to develop and present media sponsorship demand profile for media that are not sponsored. This information can be used by copyright holders to decide if they want to make their media available for sponsored downloading. Likewise, this information can be used by advertisers to decide if they want to sponsor the media in question.

Steps 2.2.4, 2.2.5 and 2.2.5.1 of FIG. 2.2 determine if the requested media is sponsored in title mode, artist/author mode, or market mode as follows. Step 2.2.4 checks to see if an advertiser is sponsoring the specific media title (through the bidding process).

Step 2.2.5 determines if the member who is requesting a sponsored download, based on the member's profile, is sponsored by an advertiser. Advertisers can choose to sponsor downloads of members whose profile provides a good match for a target audience the advertisers are trying to reach with their advertisements. If a member is sponsored by an advertiser, the member can only download media titles that are not specifically sponsored in media title mode.

Step 2.2.5.1 checks to see if an advertiser is sponsoring the artist or author of the specific media title, which would imply that all or part of the media titles by the artist/author are sponsored, including the media title requested by a member for download.

FIG. 2.2.6 is a flow diagram depicting a process to select and connect advertisements to media, and program sponsorship parameters, according to an embodiment of the invention. When advertisements are selected by the system, they are programmatically connected to the content. This sub-process describes the steps involved in identifying the sponsors of member requested media, reading advertisements and sponsorship parameters established in step 1.5.5, connecting the advertisements to sponsored media, and preparing an ad-version of the media ready for downloading.

In step 2.2.6.1, the sponsors of media are identified for further processing. Notice that more than one sponsor may be identified for each media title, based on the bidding process described in FIG. 1.5. For example, a song may have two sponsors; one advertiser may win the bid to place its advertisements at the beginning of the song, and a second advertiser may win the bid to place its advertisements at the end of the song. In this case, both sponsors will be selected for further processing. Also, more than two advertisements can be selected per song, and connected to the song.

Steps 2.2.6.2 through 2.2.6.4 use the information supplied by step 1.5.5 to select the appropriate advertisements, the placement of each advertisement in the media title, the waiting period for each advertisement, and the rotation and playback conditions for each advertisement.

In step 2.2.6.5, all advertisements are connected to the media, and time-stamps, expiration and/or rotation parameters are registered for each advertisement in the member's account. Expiration parameters may include, but are not limited to:

Time bomb—delete the advertisements after a certain period of elapsed time

Credits—delete the advertisements after the user has generated target revenues by listening to the advertisements Number of Listens—delete advertisements after the user has heard the advertisements a certain number of times Promotions—delete advertisements immediately after the system or other entity releases a promotion for the downloaded files. For example, to attract business, after users download versions of a song by OUTKAST with advertisements, the system or other entity can ask users to visit the system web site to download a token that will instruct the special software or DRM on the user's device to immediately expunge advertisements associated with the said OUTKAST song.

The rotation parameters may include, but are not limited to:

Delay—delay playing the advertisements for a specified period of time after download Schedule—play the advertisements according to a specific or a general schedule. For example, specific schedule can include playing the advertisements on Fridays and Saturdays, and not on any other days, or playing the advertisements on specific dates, times of day, like mornings, lunch times, or dinner times, and special occasions, like birthdays, Mother's Day, etc. General schedule can include playing the advertisements twice in a day, then waiting for 5 days before playing the advertisements again.

Advertisements programmed to playback, expire or rotate, or time-stamped advertisements can be recognized by special custom software or special digital rights management (DRM) software, which resides on the member's media playback or other device. The special software uses the information contained in the parameter file of the media package, to control the playback of the advertisements, and upon satisfaction of programmed conditions or events, to expire them automatically, and expunge them from the media package, leaving the member with advertisement free version of the media file.

Advertisements can also be tagged to instruct the special software or DRM to rotate advertisements played with each song based on exogenous factors and endogenous factors. Exogenous factors may include the users' GPS location (from the GPS enabled 3G phone MP3 player), real-time news feeds, weather (for example, if rain is forecasted, then play raingear advertisements), traffic conditions, etc. Endogenous factors may include items related to user's profile (birthday, daily computer-maintained schedule (e.g. Outlook), shopping habits, age, etc.).

More than 2 advertisements per sponsor and/or song can also be tagged to play on the computer, the MP3 player, or 3G Phone and other media playback devices, based on other algorithms, such as time-of-day, GPS information (user's location), weather, traffic, and any other piece of real-time data that makes playing of the advertisement more targeted and personalized to the user. Which advertisements get played with the song will be determined by the rotation parameters that are downloaded with the song. For example, an advertiser such as a restaurant chain (e.g., McDonald's) can have 3 advertisements to play with a sponsored song based on time of day. Breakfast advertisements may play in the morning, lunch advertisements may play around noon, and dinner advertisements may play in the evening. A multi-brand company may have advertisements applicable to workouts (e.g., sport drink) play in the morning and evening hours (when most people work out and listen to their MP3 players), and snack foods during snacking hours, like mid-morning or mid-afternoon. A restaurant or store (e.g., Starbucks), on the other hand, may tag its advertisements to play during morning hours, when the listeners 3G GPS enabled phone is in proximity of the restaurant or store, for example. In general, by giving sponsors and advertisers wide berth to tag their advertisements for playback based on exogenous parameters of their choice, advertisement effectiveness will be maximized, and the advertisements may become timely delivered needed information to users.

In step 2.2.6.7, the ad-version of the media is created for the member to download.

FIG. 2.3 is a flow diagram illustrating the media version monitoring and replacement process which may be used, according to an embodiment of the invention. Once content and advertisements are downloaded, the system monitors the package to determine when to give the member ad-free content. This process uses the time-stamp, or other AdExpire parameter based information to replace the ad-version of downloaded media with the ad-free version, as soon as the waiting period is over, and/or AdExpire conditions have been met.

Members log-in to the system web site. After downloading sponsored media, members periodically visit their account at the system website to download other media or interact with other members, advertisers, and copyright holders.

The system automatically checks the current time, and compares the time with the time-stamps of the ad-version of the media. The system also checks to determine if other AdExpire parameter based conditions have been satisfied.

If the waiting period has expired, or AdExpire conditions have been satisfied on the ad-version of the media, then the step 2.3.3.1 checks to see if the current sponsor is offering credits for extending the waiting period, or additional AdExpire conditions. If credits are offered, and in step 2.3.4 the member wants to earn credits by extending the waiting period or additional AdExpire conditions for selected media titles, then in step 2.3.5 the time-stamps and additional AdExpire conditions are refreshed, and the ad-versions of the media are kept intact on the member's device. Alternatively, existing advertisements can be replaced with new advertisements at Advertiser's request.

If step 2.3.3.1 credits are not offered, or similarly, in step 2.3.4 the member does not want to agree to the waiting period or AdExpire conditions to earn credits, then in step 2.3.6 the ad-versions of the media are replaced by the ad-free versions automatically. This can be accomplished by downloading an ad-free version of the files to the member's device, or by instructing the special software on member's device to expunge the advertisements from the ad-version of the files.

If in step 2.3.3 it is determined that the waiting period or AdExpire conditions have not been met, then the ad-version of the files are kept intact on the member's device.

In step 2.3.7, the member is asked to rate, on some cardinal scale, the media title, the advertisement, and the advertiser. When rating a media title, a good rating by a member is used by the business method to strongly associate the media title, its genre, and other attributes implied, with the profile of the member and the target market the member represents. A bad rating will have the opposite effect. This information is used by the system's business method to help advertisers fine tune their advertisement targeting based on the types of media titles they sponsor.

When rating an advertisement, a good rating by a member tells the advertisers that their advertisements are appropriate for the target market represented by the member. A bad rating will prompt the advertiser to change its advertisements for the target market represented by the member.

When rating an advertiser, a good rating by a member will indicate that the advertisement is having the desired impact on the member. For example, if the advertiser's goal is to build brand awareness, then a good rating will indicate that its brand is being enhanced. A bad rating will indicate that the advertisements are not performing as they should.

Other information may be collected in this step to enhance advertisers' ability to maximize the impact of their advertisements by fine-tuning their advertisements, and the media titles they choose to sponsor.

Alternatively, members can set a preference in their profile that bypasses the process described in FIG. 2.3 and uses the time-bomb or expiration feature of the special software or DRM software to automatically expunge the advertisements from their media packages. Using this process, the special software or DRM software residing on the member's device reads the time-stamp or expiration parameters for the advertisement and the real clock of the device. As soon as the waiting period and/or expiration parameter conditions are satisfied for the advertisements to expire, the special software or DRM software automatically deletes the advertisements from the media package, or tags the advertisement to be skipped during playback, without any member intervention.

Thus, an embodiment may include methods and/or logic that sets advertisement expiration conditions for each advertisement in the form of programmable parameters, and upon satisfaction of conditions, causes the advertisement to expire or be expunged from the user's media player device.

Thus, an embodiment may include methods and/or logic that sets advertisement playback conditions for each advertisement in the form of programmable parameters, and uses a special software or DRM software on the user's media playback device to read these parameters and playback advertisements based on the parameters.

Figure 3:
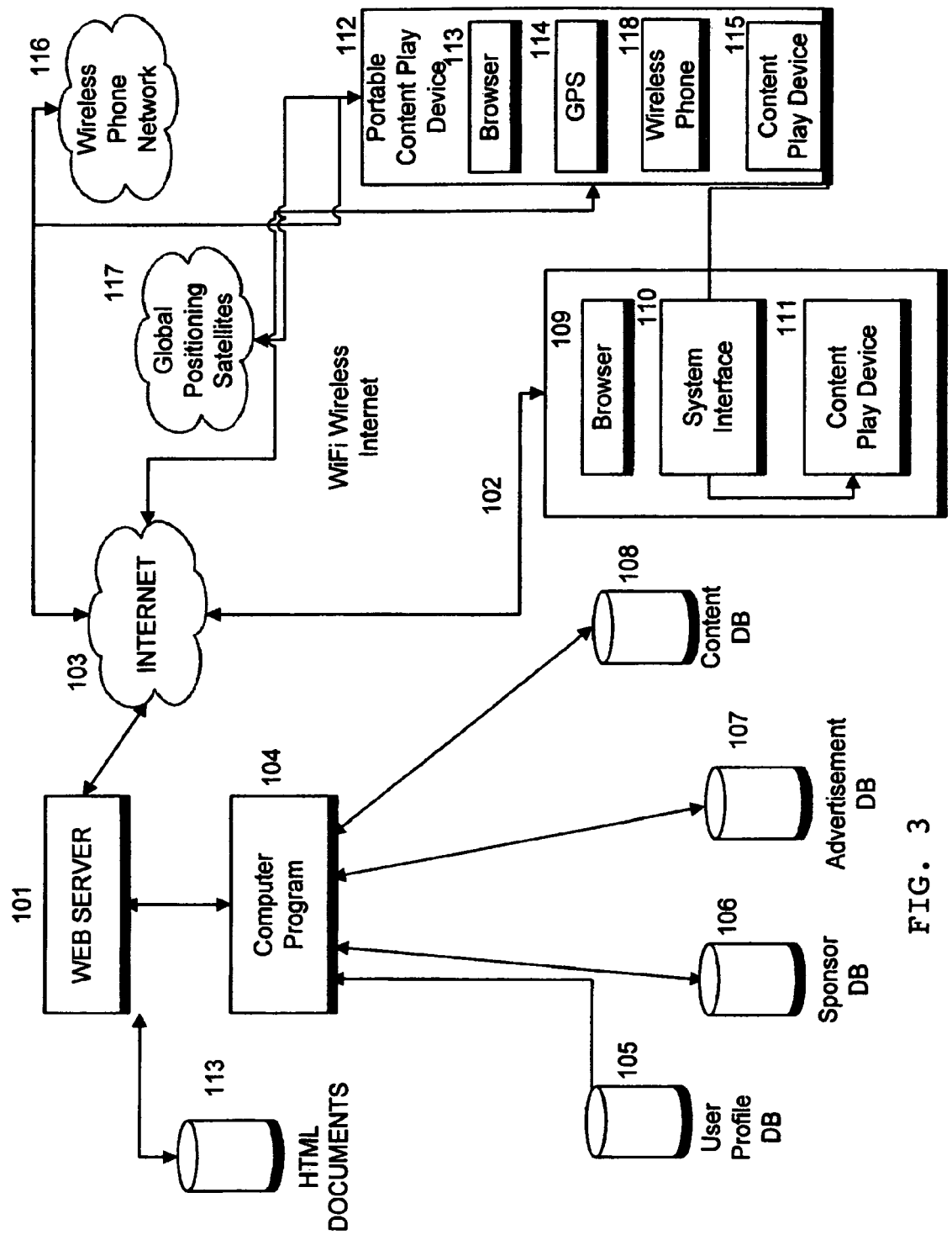
FIG. 3.1 is a block diagram illustrating a system which may download various media content and advertisements, according to an embodiment of the invention.
Figure 3A:
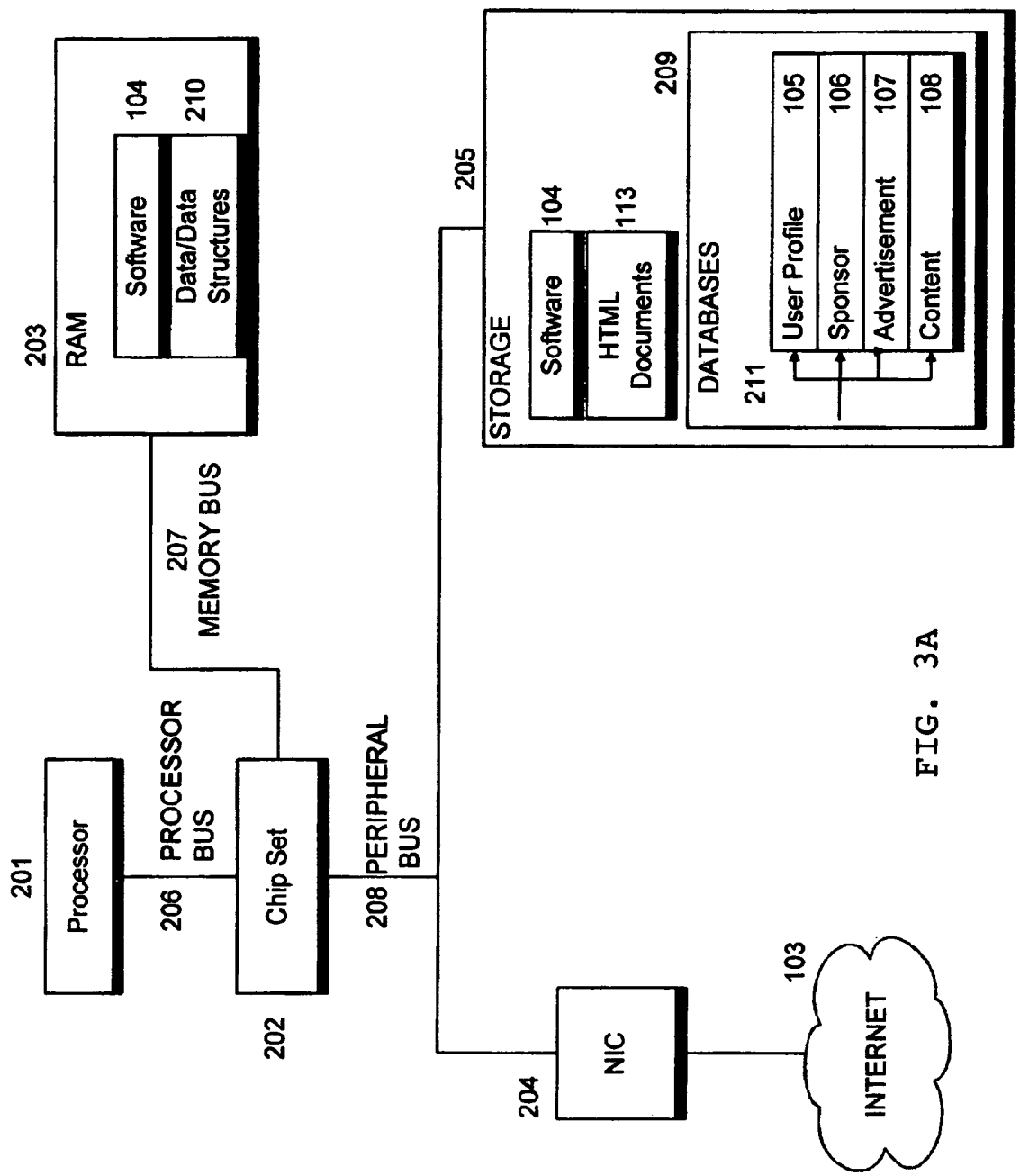
Figure 3B:
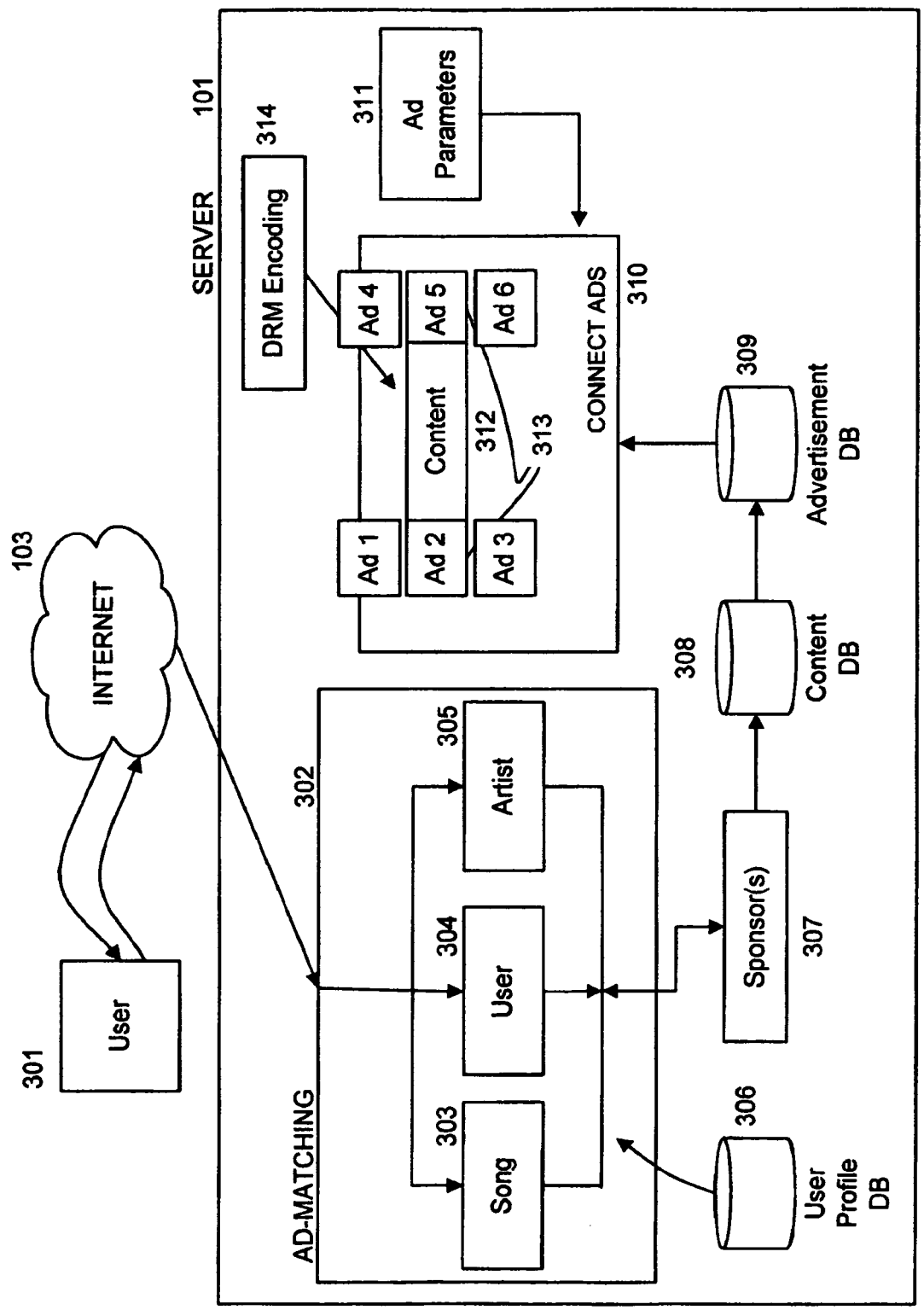
Figure 3C:
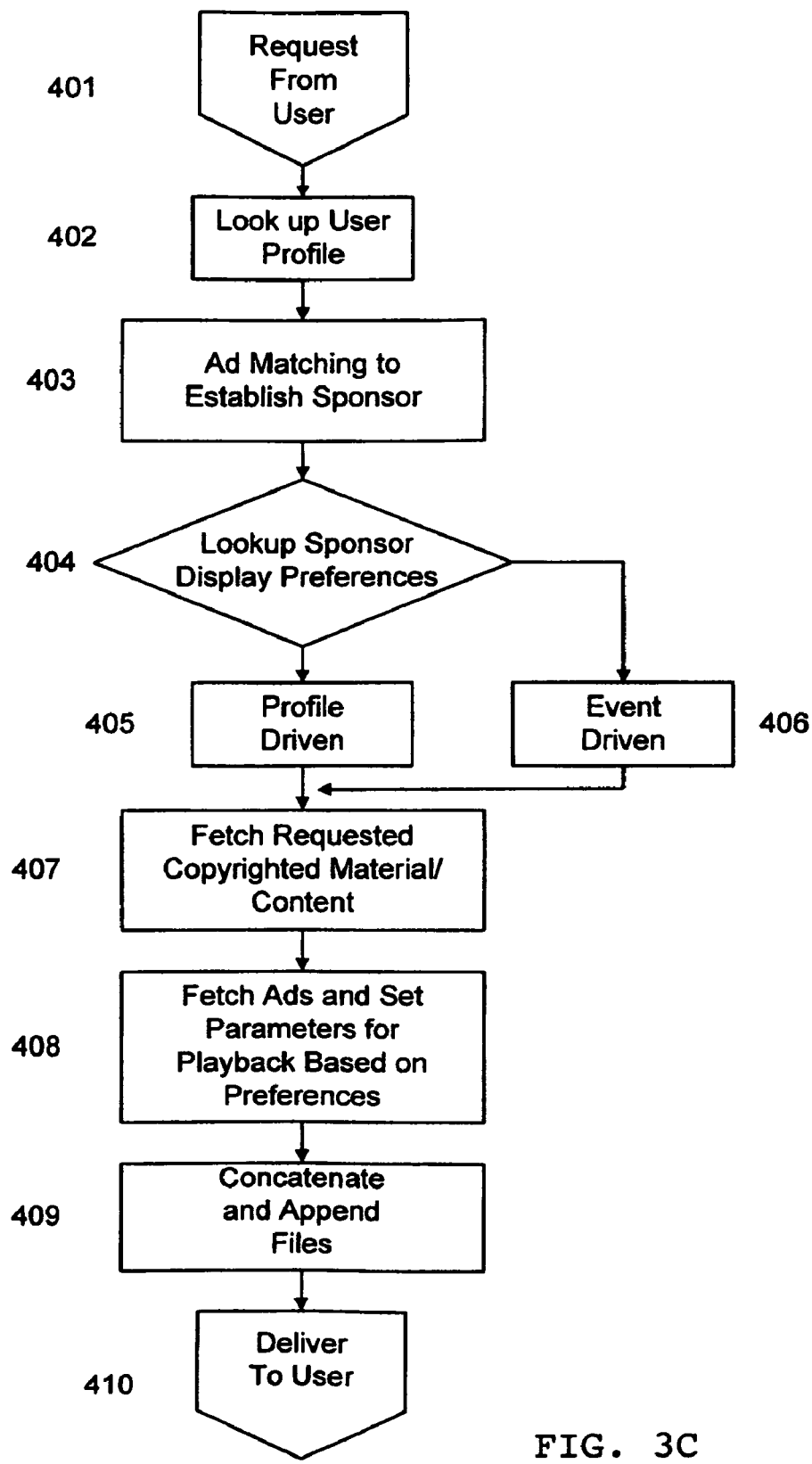
Figure 3D:
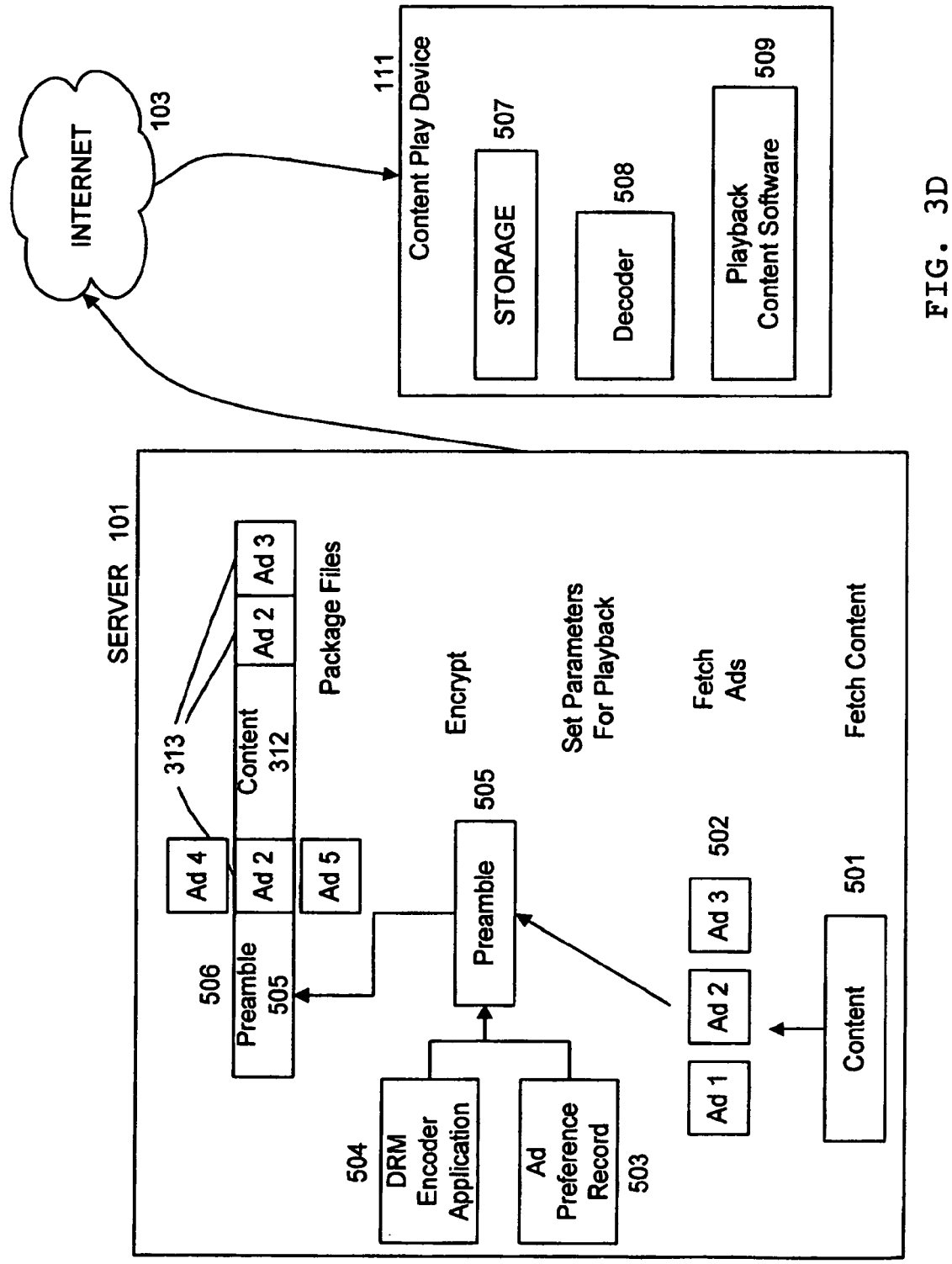
Figure 3E:
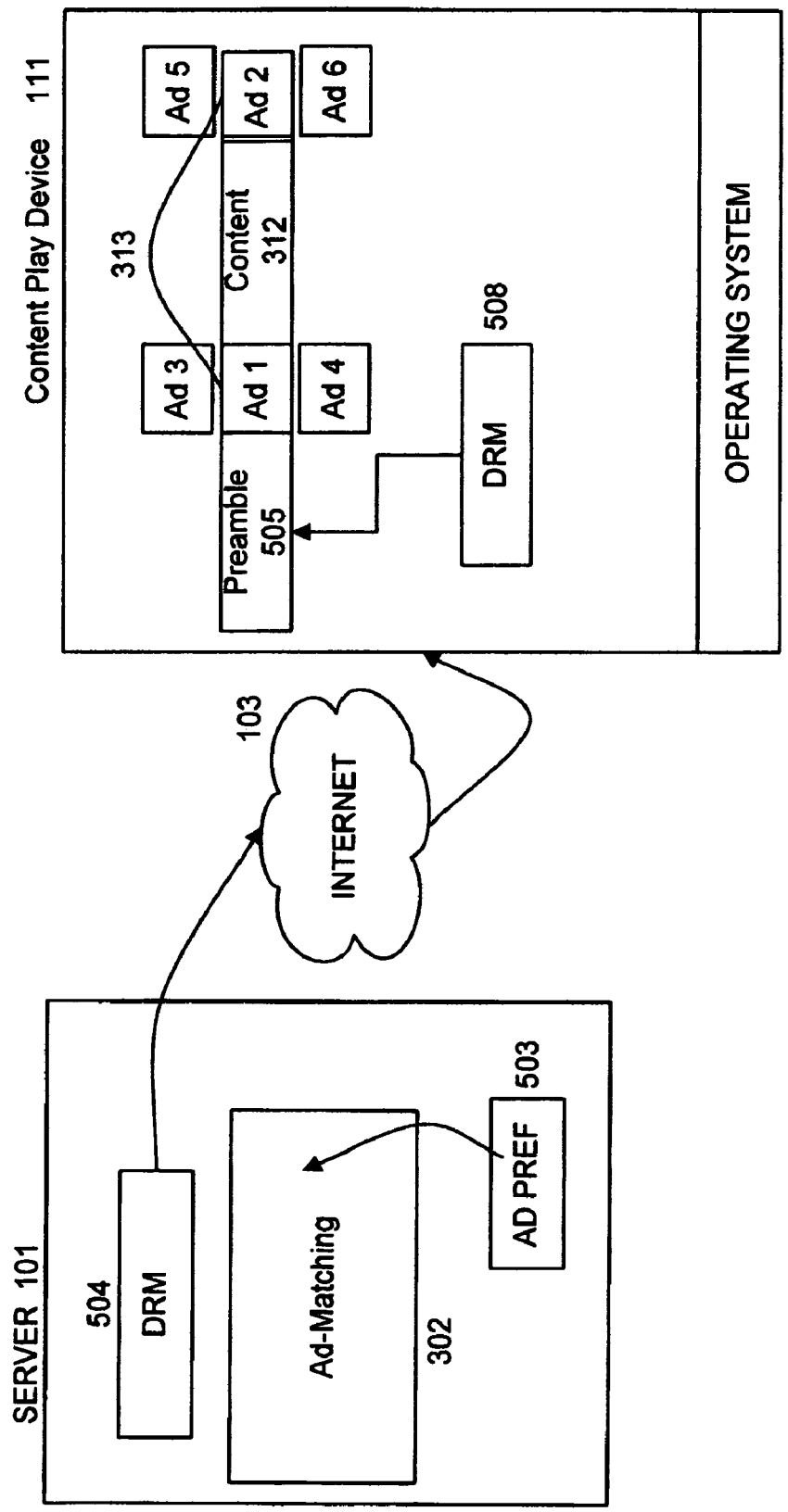
Figure 3F:
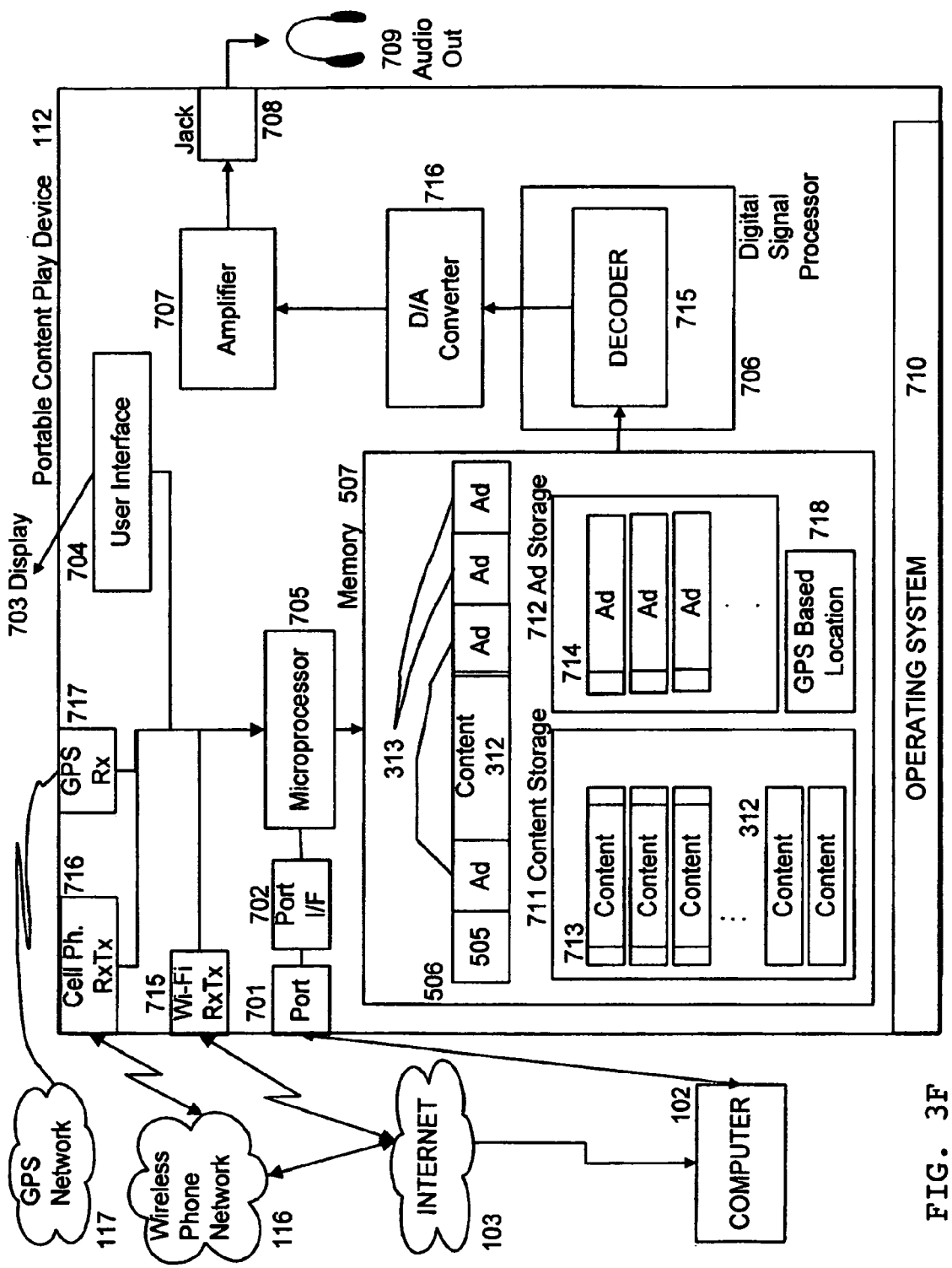
Figure 3G:
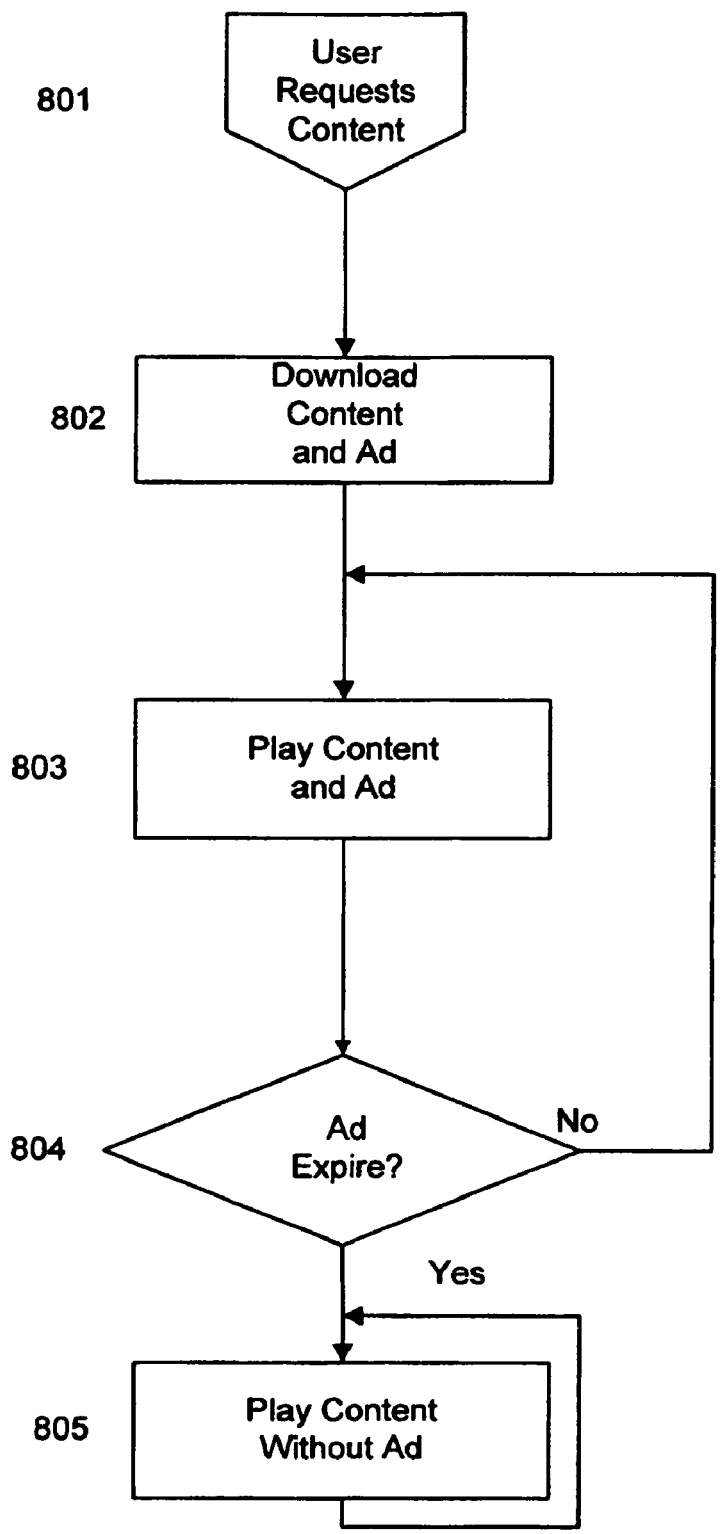
Figure 3H:
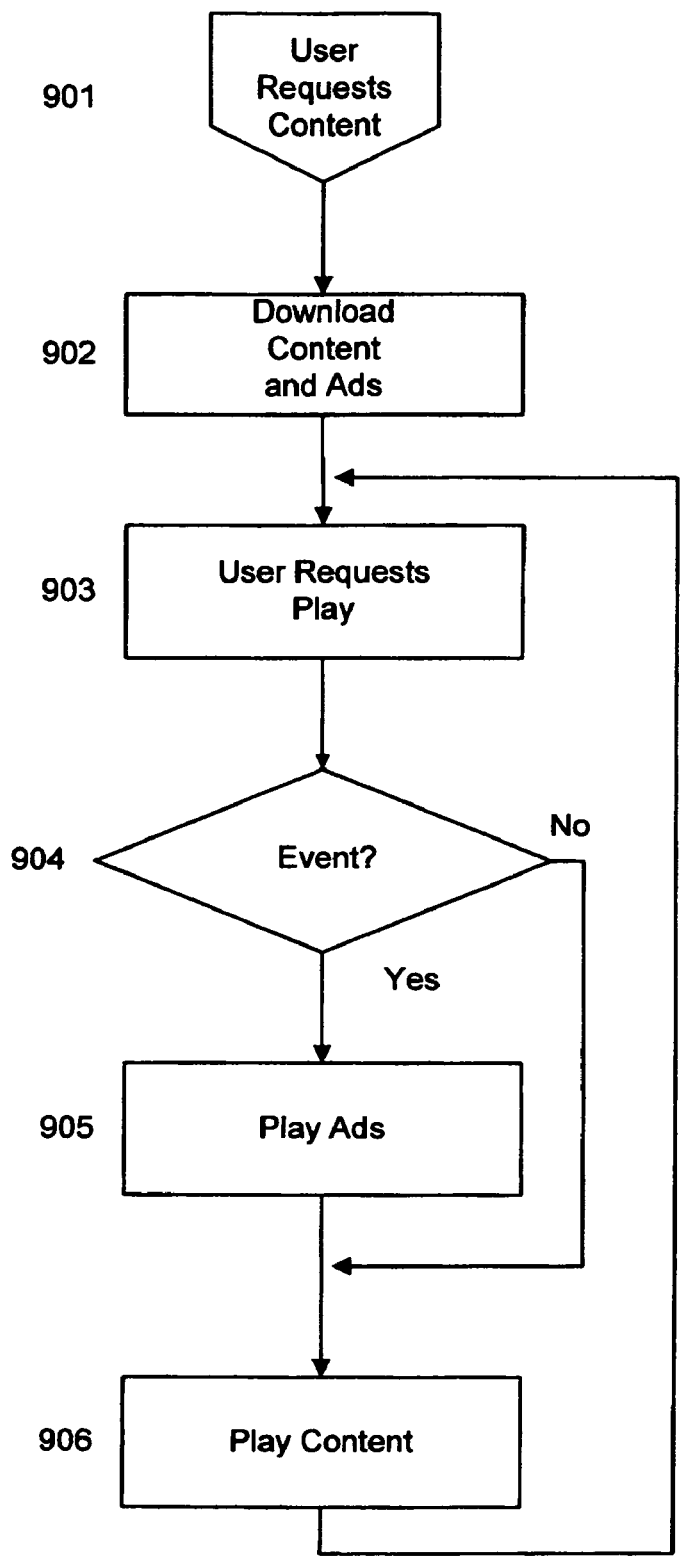

FIG. 3.1 is a block diagram illustrating a system, including a web server 101 and one or more client computers 102, which may download various digital content and advertisements, according to an embodiment of the invention.

The web server 101 communicates with the client computer over a network 103, such as the Internet or some other network such as a local area network (LAN) or intranet. FIG. 3.1 shows several elements (104, 105, 106, 107, 108) as separate items, although it will be understood that these items may all be part of the web server system 101 or may be distributed over other computers and storage systems and accessed by web server 101 or may be distributed over other computers and storage systems and accessed by web server 101 over a local area network (LAN) or other network. These elements include computer programs which include the software instructions executed by web server 101 and databases (105, 106, 107, 108).

The client computer 102 may be a wired or wireless device, and may include a web browser 109, or other client software for displaying web pages. The web browser 109 gives access to an interface 110 (such as a user interface) which allows client computer 102 to communicate with web server 101 over a network 103. The client computer 102 also includes a content play device 111, which may be a software application running on the client computer 102. The interface 110 interacts with the content play device 111 on the client computer as well as any portable content play devices 112 that may be plugged into the client computer 102. The portable content play device 112, can also be a wireless device, with special browser software 113, a Global Positioning Satellite (GPS) receiver and software 114, and wireless voice and data communication capability 118.

The following is an example method used in connection with the system in FIG. 3.1 to allow sponsored downloads of digital content and the customized placement of advertisements that are downloaded along with the advertisements. The web server 101 provides a web site that acts as an interface for users using a client computer 102 or Portable Content Play Device 112 to download digital content, for sponsors who wish to upload advertisements, or copyright holders who wish to set prices and upload copyrighted digital content. The web pages are served by web server 101 from a directory of HTML documents 113 on storage connected to the web server. If using client computer 102, the user submits a request to download digital content through the interface 110 on the web browser 109 via the Internet 103 to the web server 101. The web server then submits a request to a computer program 104 to connect the appropriate advertisements from the advertisement database 107 to the requested digital content from the content database 108.

The computer program 104 uses information from the user profile database 105, the sponsor database 106, and the sponsor's advertisement preferences to determine which advertisements are appended to the requested digital content. According to various embodiments, an advertisement-matching algorithm will choose advertisements based on what the sponsors choose to sponsor (groups of users, digital content, artists, or events), sponsor bid, advertisement parameters (where in the content the advertisements go, what causes them to expire), and advertisement type (audio, video, graphics, text, etc.).

Copyright holders, such as media companies, post digitized content to the web server 101 through an interface 110 on their client computer 102. This content is stored in the content database 108. The copyright holders specify a minimum bid per download of the content.

Sponsors submit a bid to sponsor different demographics of users, specific digital content, artists, or events. These specified criteria allow sponsors to narrowly target their advertisements. Sponsors who win the bid submit advertisements through the interface 110 on the web browser 109 via the Internet 103 to the web server 101. The web server stores the advertisement as well as any advertisement parameter information in the advertisement database 107. Alternatively, the wireless portable content play device 112, can carry out all the functions of client computer 102, as described above, using web browser 113 and wireless internet connection provided by wireless phone network 116. GPS receiver and software 114, uses global positioning satellite network 117, to constantly determine the location of the user of portable content play device 112. This location information can be used by content play device 112 to select advertisements to play with user selected content. Location based playback of advertisements is determined by parameters set by advertisers.

FIG. 3.2 is a block diagram showing the architecture of a web server system according to an embodiment of the invention. As shown in the example embodiment of FIG. 3.2, the web server system may include a processor 201 for processing instructions. The processor is connected to a chipset 202 by a processor bus 206. The chipset 202 is connected to random access memory (RAM) 203 by a memory bus 207 and manages to access the RAM 203 by the processor 201. The chipset 202 is also connected to a peripheral bus 208. The web server system also includes one or more network interface cards (NICs) 204 connected to the peripheral bus 208 for providing network interfaces to a network 103, such as Internet. External storage 205, such as a disk array or other non-volatile storage, is also connected to peripheral bus 208.

Software 104, databases 209, and HTML documents 113 are stored in external storage 205 for other computer readable medium and may be loaded into RAM 203 for use by the processor 201. Portions of data from databases 209 may be loaded into data structures 210 in memory 203 or other computer readable medium for manipulation by processor 201 in accordance with software 104. The web server 200 includes an operating system for managing system resources, as well as application software running on top of the operating system. As shown at 211, the databases may contain cross references or links to one another to allow information to be queried and retrieved.

FIG. 3.3 is a block diagram showing the process to retrieve digital content within a web server 101 when a user requests digital content, according to an embodiment of the invention. FIG. 3.4 is a flow diagram showing the steps that take place within a web server when a user requests digital content, according to an embodiment of the invention. As shown in the example embodiment, the user 301 makes a request for media content (block 401) which is communicated over a network 103, such as the Internet or some other network, to the web server 101.

On the web server 101, the song request goes through an advertisement-matching algorithm 302, (block 403) which returns one or more sponsors if any exist. In one embodiment, the user 304, the artist 305, or the song 303 may be sponsored. The advertisement-matching algorithm may look at the user profile 306 (block 402) and song request and determine the chosen sponsors 307 based on who or what is sponsored, the bid amount, and the advertisement parameters that the sponsor has specified (block 404). The sponsor advertisement parameters may be profile driven (block 405) or event driven (block 406).

Once a sponsor is selected 307, on the web server 101, the requested content is chosen from the copyrighted files database 308 (block 407) as well as the selected advertisements from the advertisement database 309 (block 408). Then the advertisements are connected to the content 310 (block 409). The advertisements may be connected to any part of the file. For example, for an audio mp3, an advertisement may be connected to the beginning and the end of the song. Or in a video file, an advertisement may be connected at the beginning and end, and at some points in the middle. The advertisement parameters 311 for each of the selected advertisements 313 are appended to the file 312, and the entire package is encoded using some type of digital rights management (DRM) application 314. The advertisement parameters 311 may include information on the conditions of playback and rotation of advertisements 313.

DRM encrypts the digital work and distributes both the encrypted package and decryption key to the client computer's system (block 410). The party distributing the content may choose to restrict what the user can do with such distributed content. For example, the content owner may wish to restrict the user from copying and redistributing such content to a second user, or may wish to allow distributed digital content to be played only a limited number of times, only for a specified total time, only on a specified type of machine, and so forth according to the appended advertisement parameters.

The encrypted package is then delivered from the web server 101 over the network 103 back to the user 301 on the client computer (block 410).

FIG. 3.5 is a block diagram illustrating how DRM encodes the file to be delivered to the user, according to an embodiment of the invention. FIG. 3.5 shows a system, including a web server 101 that communicates with a content play device 111 on a client computer (such as client computer 102) over a network 103, such as the Internet or some other network. In a separate embodiment, the web server 101 communicates with a portable content play device (such as portable content play device 112) through a wireless phone network 116, or wireless connection (e.g. WiFi, Bluetooth, or other wireless network) to network 103.

The web server 101 encodes the content using some form of DRM. The web server 101 fetches the content 501, and fetches the advertisements 502 selected according to the results of the advertisement matching algorithm. Each of the advertisements has an advertisement preference record 503, created by the advertiser, which sets the parameters for playback. The advertisement parameters are encoded using a DRM application 504, and are connected and/or appended to the content and advertisement files in a type of preamble 505 that the DRM application 504 on the client side will know how to read. The file being sent from the web server 101 is a packaged file 506 containing the preamble 505 with the advertisement parameters, the content 312, and the advertisements 313, all of which are encrypted.

The content play device 111 includes some form of storage 507, such as a disc array, or other non-volatile storage. The content play device also includes a DRM decoder 508, which may decrypt the encoded packaged file. A content playback software application 509 allows the content play device to actually play back the content.

FIG. 3.6 is a block diagram illustrating how DRM works to encode and decode the packaged files, according to an embodiment of the invention. FIG. 3.6 shows the system, including a web server 101 that communicates with the content play device 111 over a network 103, such as the Internet. The web server 101 encodes the packaged file while the content play device decodes the packaged file.

As discussed, the advertisement parameters 503 are inputted into the advertisement-matching algorithm 302 to determine the sponsored advertisements for the requested content. The advertisement parameters 503 are then encoded using the DRM application 504, which tacks it to the file as a type of preamble and encrypts the entire file. The packaged file is sent over the network 103 to the content play device 111.

The content play device 111 also has a DRM application 508 that is able to read the encryption. The DRM 504 from the server side also sent the decryption key to the client computer. The DRM 508 on the content play device reads the encoded preamble 505, which determines the advertisement parameters.

FIG. 3.7 is a block diagram showing the architecture of a portable content play device 112, according to an embodiment of the invention. The portable content play device 112 is connected to a client computer 102 which is connected to a network 103, such as the Internet or some other network, through a port 701, which is internally connected to a port interface 702. The portable content play device 112 can also connect to a network 103 through a WiFi wireless port 715, or through a cell phone port 716, which connects to a network 103 through a wireless phone network 116. A GPS Rx (receiver) port 717 receives information from GPS network 117, which is sent to the microprocessor 705 for processing to determine the location of the user. The portable content play device 112 also communicates with user via a user interface 704, which is also connected to a display 703. For example, the display may include a computer monitor, or an LCD panel, or any other suitable user communication means. The user interface 704 is coupled with a microprocessor 705, which is connected to the memory storage 507. The microprocessor 705 of the portable content play device 112 interprets the instructions and processes the data contained in the various computer programs. The microprocessor 705 also monitors user input, displays information about the current content on the display 703 and sends directions to the digital signal processor chip that tells it exactly how to process the audio. The port interface 702 is also connected to the microprocessor 705.

The packaged file 506 from the web server 101 is placed in memory storage 507 of the content play device 112. When the DRM application decrypts the packaged file 506, the content 312 and advertisements 313 are placed in a content storage database 711 and an advertisement storage database 712 respectively. When the advertisement parameters are profile-driven, the advertisement parameters, the content, and the advertisement remain as one package 713 and are stored in the content storage database 711. When an advertisement expires, the appended advertisement 313 and advertisement parameters are removed and only the content 312 remains in the content storage database 711. When the advertisement parameters are event-driven, only the content 312 is stored within the content storage database 711, and the advertisement parameters with the advertisements 714 are stored within the advertisement storage database 712. When the advertisements 714 in the advertisement storage database 712 expire, they are removed from the database. According to an embodiment, the device also contains updated information about the user's location. For example, memory storage 507 may contain information regarding user's location, and the information may be received from the microprocessor 705 as data arrives from the GPS Network 117 through GPS Rx port 717. The location information real-time (e.g., up-to-the-second). This location information can be used to determine which advertisement to play from the Ad Storage 712.

The memory storage 507 is connected to the digital signal processor 706. The digital signal processor 706 includes a decoder 715. The decoder 715 runs a decompression algorithm that undoes any compression on the content file. The digital signal process is coupled to a digital-to-analog (D/A) converter 716, which turns the digital bytes back into sound waves. The digital signal processor 706 is also connected to an amplifier 707 which increases the strength of the signal and sends it to the jack 708, through which the content goes out. The jack may be connected to some form of audio device such as speakers or headphones 709.

Also on the portable content play device 112, an operating system 710 is running in the background and managing the hardware and software resources. The operating system 710 also manages processes which are controlled by the microprocessor 705.

In an alternative embodiment, the portable content play device 112 of FIG. 3.7 may represent a content play device 111 which is an application running on the client computer 102.

FIG. 3.8 is a flow diagram of when the advertisement parameters are profile-driven, according to an embodiment of the invention. The user first requests content from the content provider 801. The user then downloads the content and advertisements 802. The download is time-stamped and AdExpire parameters are set. The user then plays the content and the appended advertisements 803. The advertisement parameters of each of the advertisements may be based on a length of time the advertiser wishes the song to play. For example, the advertisement may expire within five days from when the user starts listening to the song. Alternatively, the advertisement parameters may also include a specified number of times for the advertisement to be played back. For example, the advertisement may expire when it is played five times. It would be possible to program the package so that the advertisement would not play more than once a day.

The program determines whether the advertisements have expired 804. As long as the advertisement has not expired, whenever the user plays the content on the content play device, the play device will play the content with the appended advertisements 803. Once the advertisements expire, the advertisements are removed and the user can listen to the content free of advertisements 805.

FIG. 3.9 is a flow diagram of when the advertisement parameters are event-driven, according to an embodiment of the invention. The user first requests content from the content provider 901 and downloads the content and advertisements 902. When the advertisement parameters are event-driven, the advertiser may specify specific events for which the advertisement may play. For example, an advertiser may specify to play a flower delivery advertisement if the content play device is playing downloaded content the week before Mother's Day. Another example is an advertiser may wish for a coffee advertisement to play if the content play device is playing early in the morning or late at night. A third example is an advertiser may specify an advertisement to play in different languages, depending on the location of the user, as determined by the GPS capability of the user's portable content play device (such as device 112 in one such embodiment).

When the user requests to play the content on the content play device 903, the content play device determines whether a predetermined event has occurred 904. If the event has occurred, then the content play device will play the advertisement 905 along with the content 906. If the event has not occurred, the content play device will play the content alone 906.

The event-driven and profile-driven advertising parameters may be combined in another embodiment of the present invention. For example, the advertiser may specify that the advertisement only play for a particular event, but then place a time limit. One example is if the event does not occur while the content device is playing within six months, the advertisement will automatically expire. In another example, the advertiser may specify the advertisement only play for a particular event, and only play three times total, so that the advertisement is not hanging around forever. Any of these advertising parameters may be combined.

An embodiment is directed to a method for distributing content comprising requesting, through a computer network, a download of particular content; receiving the particular content, wherein the particular content is combined with additional content not specifically requested; storing the particular content and the additional content not specifically requested in a user's content play device; receiving a user request to play the particular content on the user's content play device; determining whether the additional content not specifically requested has expired; if it is not determined that the additional content not specifically requested has expired, in response to user request to play the particular content, playing the particular content on the content play device and the additional content not specifically requested; and if it is determined that the additional content not specifically requested has expired, in response to user request to play the particular content, playing the particular content on the content play device without playing the additional content not specifically requested.

An embodiment may include receiving, with the additional content not specifically requested, information determining an expiration of play of the additional content not specifically requested; storing the information determining an expiration of play of the additional content not specifically requested in the user's content play device; and determining whether the additional content not specifically requested has expired based on the information. An embodiment may include storing a user profile; and when a request is received, through the computer network, for download of particular content, accessing the user profile and selecting the additional content not specifically requested based on the user profile.

An embodiment may include associating a first set of additional content not specifically requested with one set of content selected by the user and a second set of additional content not specifically requested with another set of content selected by the user; and based on having received the request to download content from the one set selected by the user, selecting associated targeted content from the first set of targeted content. An embodiment may include associating at least one sponsor with the content, the sponsor having a set of one or more items of content not specifically requested; and selecting additional content not specifically requested from the sponsor's items of content not specifically requested based on having received the request to download the particular content.

An embodiment may include determining whether the targeted additional content has expired using digital rights management, and an embodiment may include providing a user input associated with the additional content not specifically requested.

The user input associated with the additional content not specifically requested may comprise an item on the user's content device that can be clicked to initiate an action associated with the additional content not specifically requested.

An embodiment is directed to a method for distributing content comprising: requesting, through a computer network, a download of particular content; receiving the particular content, wherein the particular content is combined with a additional content not specifically requested; storing the particular content and the additional content in a user's content play device; receiving a user request to play the particular content on the user's content play device; determining whether it is within a particular time of occurrence of an event; if it is determined that it is within a particular time of occurrence of an event, in response to a user request to play the particular content, playing the additional content and the particular requested content on the content play device; and if it is determined that it is not within a particular time of occurrence of an event, in response to a user request to play the particular content, not playing the additional content on the content play device.

According to an embodiment, the particular time comprises a particular amount of time in advance of the event. The particular time may comprise any time within the range from three weeks in advance of the event until the event. The event may comprise a birthday.

An embodiment may include storing a user profile; and when a request is received through the computer network for download of particular content, accessing the user profile and selecting the additional content based on the user profile.

An embodiment is directed to a system for providing content. The system may comprise: database including content; database including additional content not specifically requested by the user; logic that receives a request for a particular item of content; logic that based on the request, determines a sponsor for the content; logic that obtains an additional item of content of the sponsor from the database; logic that obtains the requested content from the database; logic that combines the content and additional content not specifically requested; and logic that sends the combined content and additional content over the network for receipt by the user.

The system may include the following alone or in combination: logic that determines a sponsor based on the particular content; logic that determines a sponsor based on an artist of the content; logic that determines a sponsor based on information regarding the user.

An embodiment may include a database with user profiles; and logic that determines the additional content at least in part based on the user profile from the user profile database.

An embodiment is directed to a system for providing content including logic that obtains a particular item of content; logic that obtains one or more items of additional content not specifically requested; logic that combines the content and the additional content; logic that provides parameters determining the play of the additional content; logic that combines the content and the additional content and the parameters; and logic that sends the combined content and additional content and parameters over the network for receipt by a content play device. The additional content may comprise an advertisement.

The parameters may determine expiration of the additional content. According to an embodiment, the parameters may determine play of the additional content in relation to an event. The parameters may be provided in a format that causes digital rights management software on a content play device to play the additional content as determined.

The content play device may comprise logic that stores combined content and additional content and parameters in content play device; logic that reads parameters determining the play of the additional content; and logic that plays content and additional content.

The logic that provides parameters determining play of the additional content may comprise digital rights management software. The logic that reads parameters determining play of the additional content may comprise digital rights management software.

An embodiment is directed to a device for playing content comprising a digital input port; a user interface for display of information related to content playback; a decoder for decoding the content; a digital to analog converter coupled to the decoder; an amplifier coupled to the digital to analog converter; an external audio output coupled to the amplifier; storage with space for digital content and at least one item of additional content and parameters that determine playback of the additional content; and logic that determines playback of the additional content based on the parameters.

The logic that determines playback may comprise digital rights management. The logic may comprise software; the logic may also or alternatively comprise circuitry.

An embodiment of the device may include global positioning circuitry. An embodiment of the device may include communication 30. An embodiment of the device may include communication circuitry, for example, according to various embodiments, digital communication circuitry, which may include circuitry for telephonic voice communication and/or data communication.

An embodiment is directed to a method for distributing content comprising registering copyright holders with a system; allowing copyright holders to upload content to the system; allowing copyright holders to set a minimum bid on the uploaded content; registering members with the system; allowing a member to request content from the system; registering sponsors with the system; allowing sponsors to bid on sponsoring the requested content; allowing sponsors to upload sponsor content to the system; selecting sponsor content to go with the requested content; appending the selected sponsor content to the requested content; and delivering the requested content with the appended sponsor content to the requesting member.

The sponsors may comprise advertisers, and the sponsor content may comprise an advertisement. An embodiment may include monitoring demand for the particular content and displaying the demand, for example to sponsors or other users.

An embodiment may include providing a mechanism for user input associated with the appended sponsor content. A graphical advertisement associated with the appended sponsor content may be provided. An advertisement associated with the appended sponsor content may be provided, and a mechanism that initiates an action associated with the advertisement in response to a user action may be provided. An advertisement associated with the appended sponsor content may be provided, and a mechanism that initiates an action over a network in response to a user action may be provided.

An embodiment is directed to a method for distributing content comprising: delivering content requested by a member to the member with an appended advertisement; playing advertisements while delivering requested content; monitoring the delivered content; and replacing delivered content with an advertisement-free version of the delivered content. An embodiment may include asking the member who requested the content to rate the advertiser, advertisement, and the delivered content. Monitoring delivered content may comprise checking a timestamp on a member's download; determining whether an advertisement has expired; if it is determined that the advertisement has not expired, checking the time stamp on the member's download; if it is determined that the advertisement has expired, determining whether the advertiser is offering credits for extending a waiting period before expiration; if it is determined that the advertiser is offering credits for extending the waiting period, determining if the member wants to extend the waiting period; and if it is determined that the member wants to extend the waiting period, applying the member's credits, updating the time stamp for the content, and checking the timestamp on the member download.

An embodiment is directed to distributing content including allowing copyright holders to set a minimum bid on content uploaded to the system; receiving a request to download content; allowing sponsors to bid on requested content; determining if the copyright holder accepts bid terms from sponsor for the requested content; if it is determined that the copyright holder does not accept the bid, allowing copyright holder to send counter-bids to the advertiser; if it is determined that the copyright holder does accept the bid, specifying business terms to download content, allowing members with sponsored transactions to download content free of charge, and determining if the winning sponsor offers credits to extend the waiting period; and if it is determined that the winning sponsor does offer credits to extend the waiting period, allowing members to purchase unsponsored content with credits.

Allowing sponsors to bid on requested content may include considering cost per download; considering the length or type of the waiting period; considering the advertisement placement in relation to the content; and considering the total advertising budget.

An embodiment is directed to a method for distributing content comprising receiving a request, through a network (such as a computer network), a download of particular content; providing the particular content to a requester for storage on a content play device, wherein the particular content is combined with other content not specifically requested; using a mechanism that, upon receipt of a user request to play the particular content on the user's content play device, determines whether the other content not specifically requested is to be played in connection with the particular content based upon at least a factor; if it is not determined that the other content is to be played, in response to user request to play the particular content, allows the particular content to be played on the content play device with the other content; and if it is determined that the other content not specifically requested is not to be played, in response to user request to play the particular content, allows the particular content on the content play device without playing the other content. The other content may comprise an advertisement.

An embodiment may include playing the other content in a window that shows progress of content delivery.

The factor may include alone or in various combinations: the user's profile; usage patterns; navigation patters in use of a computer system; other navigation patters; the particular content; a user profile; time of request for the particular content; other content associated with the user; other content the user has purchased; location of the user; location of the user determined with a GPS system on the user's playback device; weather; current information received over a wireless connection on the user's device on which the content is to be played; real-time information received on the user's device on which the content is to be played; time; day, day of month, and month of year or other calendar or other time; travel, traffic, news; a parameter set by an advertiser.

An embodiments may include providing information to determine: sequence of play of the additional content; duration of play of the additional content; repetition of play of the additional content.

An embodiment is directed to a method for distributing content comprising: receiving from an advertiser an association between a set of advertisements and an item of content; receiving from an advertiser an information that determines playback of particular advertisements within the set of advertisements; delivering the content to a user based on a request for the content; delivering the set of advertisements to the user to which the content is delivered; and utilizing a mechanism to play advertisements in connection with the content. The information may determine automatic rotation of play of advertisements within the set of advertisements.

An embodiment is directed to a method for distributing content comprising receiving a request, through a network, a download of particular content; providing the particular content to a requester for storage on a content play device, wherein the particular content is combined with audio content not specifically requested; providing, to the requestor for display on the play device, visual content associated with the audio content; using a mechanism that,
   upon receipt of a user request to play the particular content on the user's content play device, determines whether the audio content is to be played in connection with the particular content;
   if it is not determined that the audio content not specifically requested is to be played, in response to user request to play the particular content, allows the particular content to be played on the content play device with the audio content; and
   displays visual content associated with the audio content during play of the audio content.

The audio content not specifically requested may comprise an advertisement, and the visual content may comprise information associated with the advertisement.

According to various embodiments, the visual content comprises video, hypertext, text, graphics, a link, and/or a link to a web page of an advertiser that is promoted in the advertisement.

While this invention has been described and illustrated with reference to particular embodiments, it will be readily apparent to those skilled in the art that the scope of the present invention is not limited to the disclosed embodiments but, on the contrary, is intended to cover numerous other modifications and equivalent arrangements which are included within the spirit and scope of the following claims.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

What is claimed is:

1. A method for distributing content, the method comprising:
   sponsoring a particular content through bidding process facilitated by an electronic or manual system;
   requesting, through a computer network, a download of particular content;
   receiving the particular content, wherein the particular content is combined with additional content not specifically requested associated with one or more winning bidders or sponsors, with one or more winning bidders selected based on criteria, which may include those other than highest bidders;
   the combination is wherein the system, the sponsor, or sponsors select how the unrequested content is to be played upon user's request to download or play requested content, and sponsor, by setting expiration parameters for unrequested content;
   the additional content is one of advertisements and other than advertisements;
   storing the particular content and the additional content not specifically requested in a user's content play device;
   receiving a user request to download to, or play the particular content on, the user's content play device;
   determining whether the additional content not specifically requested needs to be played or has expired, based on expiration parameters set by the sponsor, sponsors, or the system;
   if it is not determined that the additional content not specifically requested has expired, in response to user request to play the particular content, playing the particular content on the content play device and the additional content not specifically requested; and
   if it is determined that the additional content not specifically requested has expired, in response to user request to play the particular content, playing the particular content on the content play device without playing the additional content not specifically requested.

2. The method of claim 1 including:
   receiving, with the additional content not specifically requested, information determining an expiration of play of the additional content not specifically requested;
   storing the information determining an expiration of play of the additional content not specifically requested in the user's content play device; and
   determining whether the additional content not specifically requested has expired based on the information.

3. The method of claim 1 including:
   storing a user profile; and when a request is received, through the computer network, for download of particular content, accessing the user profile and
   selecting the additional content not specifically requested based on the user profile.

4. The method of claim 1, including providing a user input associated with the additional content not specifically requested.

5. The method of claim 4, wherein the user input associated with the additional content not specifically requested comprises an item on the user's content device that can be clicked to initiate an action associated with the additional content not specifically requested.

6. A method for distributing content, the method comprising:

sponsoring a particular content through bidding process facilitated by an electronic or manual system, receiving a request, through a network, a download of particular content;

providing the particular content to a requester for storage on a content play device, wherein the particular content is combined with other content not specifically requested associated with one or more winning bidders, with one or more winning bidders or sponsors selected based on criteria, which may include those other than highest bidders;

the combination is wherein the system the sponsor, or sponsors select how the unrequested content is to be played upon user's request to download or play requested content, by setting expiration parameters for unrequested content;

the other content is one of advertisements and other than advertisements;

using a mechanism that, upon receipt of a user request to play the particular content on the user's content play device, determines whether the other content is to be played in connection with the particular content based upon at least a factor;

if it is not determined that the other content is to be played, in response to user request to play the particular content, allows the particular content to be played on the content play device with the other content; and if it is determined that the other content not specifically requested is not to be played, in response to user request to play the particular content, allows the particular content on the content play device without playing the other content.

7. The method of claim 6, including playing the other content in a window that shows progress of content delivery.

8. The method of claim 6, wherein the factor includes the user's profile.

9. The method of claim 6, wherein the factor includes usage patterns.

10. The method of claim 6, wherein the factor includes navigation patters in use of a system.

11. The method of claim 6, wherein the factor includes a factor from a group consisting of:
the particular content, a user profile, time of request for the particular content, other content associated with the user, other content the user has purchased, location of the user, location of the user determined with a GPS system on the user's playback device, weather, current information received over a wireless connection on the user's device on which the content is to be played, real-time information received on the user's device on which the content is to be played, time, day, day of month, and month of year, parameter set by an advertiser, travel, traffic, and news.

12. The method of claim 6, including providing information to determine sequence of play of the additional content.

13. The method of claim 6, including providing information to determine duration of play of the additional content.

14. The method of claim 6, including providing information to determine repetition of play of the additional content.

15. The method of claim 6, wherein the targeted additional content comprises an advertisement.

16. A method for distributing content, the method comprising:
sponsoring a particular content through bidding process that includes:
receiving from an advertiser an association between a set of advertisements and an item of content;
receiving from an advertiser an information that determines playback of particular advertisements within the set of advertisements;
determining winning bidders from one or more bidders based on criteria, which may include those other than highest bidders;
delivering the content to a user based on a request for the content;
delivering the set of advertisements from at least one selected bidder to the user to which the content is delivered; and
utilizing a mechanism to play advertisements in connection with the content.

17. The method of claim 16 wherein the information determines automatic rotation of play of advertisements within the set of advertisements.

18. A method for distributing content, the method comprising:
sponsoring a particular content through bidding process facilitated by a manual or electronic system;
receiving a request, through a network, a download of particular content;
providing the particular content to a requester for storage on a content play device, wherein the particular content is combined with audio content not specifically requested associated with one or more winning bidders or sponsors, with one or more winning bidders or sponsors selected based on criteria, which may include those other than highest bidders;
the combination is wherein the system, the sponsor, or sponsors select how the unrequested content is to be played upon user's request to download or play requested content, by setting expiration parameters for unrequested content;
providing, to the requestor for display on the play device, visual content associated with the audio content;
the audio and visual content is one of advertisements and other than advertisements;
using a mechanism that, upon receipt of a user request to play the particular content on the user's content play device, determines whether the audio content is to be played in connection with the particular content;
if it is not determined that the audio content not specifically requested is to be played, in response to user request to play the particular content, allows the particular content to be played on the content play device with the audio content; and
displays visual content associated with the audio content during play of the audio content.

19. The method of claim 18 wherein the audio content not specifically requested comprises an advertisement, and the visual content comprises information associated with the advertisement.

20. The method of claim 18 wherein the visual content comprises video.

21. The method of claim 18 wherein the visual content comprises hypertext.

22. The method of claim 18 wherein the visual content comprises a text.

23. The method of claim 18 wherein the visual content comprises graphics.

24. The method of claim 18 wherein the visual content comprises a link.

25. The method of claim 18 wherein the visual content comprises a link to a web page of an advertiser that is promoted in the advertisement.

26. A method for distributing content, the method comprising:
- providing content for computer based networks based on a first set of conditions;
- sponsoring a particular content based on a second set of conditions through a bidding process facilitated by an electronic or manual system;
- acquiring one of sponsored content based on the second set of conditions and unsponsored content based on the first set of conditions;
- the sponsored content is comprised of the particular content combined with other content not specifically requested;
- the combination is wherein the system, the sponsor, or sponsors select how the unrequested content is to be played upon user's request to download or play requested content, and sponsor, by setting expiration parameters for unrequested content;
- the other content is associated with one or more winning bidders or sponsors;
- one or more winning bidders or sponsors selected based on criteria that at least meet the first set of conditions, which may include those other than highest bids; and
- the other content is one of advertisements and other than advertisements;
- determining whether the other content is to be played in connection with the particular content based upon at least a factor determined by the system or sponsors;
- if it is not determined that the other content is to be played, in response to request to play the particular content, allowing the particular content to be played on the content play device with the other content; and
- if it is determined that the other content not specifically requested is not to be played, in response to request to play the particular content, allowing the particular content on the content play device without playing the other content.

* * * * *